US012593179B2

(12) United States Patent
Goldstein

(10) Patent No.: US 12,593,179 B2
(45) **Date of Patent: *Mar. 31, 2026**

(54) SYSTEM AND METHOD FOR EFFICIENCY AMONG DEVICES

(71) Applicant: The Diablo Canyon Collective LLC, Wilmington, DE (US)

(72) Inventor: Steven Wayne Goldstein, Delray Beach, FL (US)

(73) Assignee: The Diablo Canyon Collective LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,725

(22) Filed: Dec. 27, 2023

(65) Prior Publication Data

US 2024/0244381 A1 Jul. 18, 2024

Related U.S. Application Data

(63) Continuation of application No. 18/085,542, filed on Dec. 20, 2022, now Pat. No. 11,917,367, which is a (Continued)

(51) Int. Cl.
*H04R 25/00* (2006.01)

(52) U.S. Cl.
CPC ......... *H04R 25/305* (2013.01); *H04R 25/552* (2013.01); *H04R 25/554* (2013.01); (Continued)

(58) Field of Classification Search
CPC .............................. H04R 25/305; G10L 15/22
See application file for complete search history.

(56) References Cited

U.S. PATENT DOCUMENTS

| | | | |
|---|---|---|---|
| 3,746,789 | A | 7/1973 | Alcivar et al. |
| 3,876,843 | A | 4/1975 | Moen |

(Continued)

FOREIGN PATENT DOCUMENTS

| | | |
|---|---|---|
| EP | 1385324 | 1/2004 |
| EP | 1401240 | 3/2004 |

(Continued)

OTHER PUBLICATIONS

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.

(Continued)

*Primary Examiner* — Rasha S Al Aubaidi
(74) *Attorney, Agent, or Firm* — Aikin & Gallant, LLP

(57) ABSTRACT

A wearable multifunction device or earpiece or a pair of earpieces includes one or more processors, at least one microphone coupled to the one or more processors, a biometric sensor coupled to the one or more processors, and a memory coupled to the one or more processors, the memory having computer instructions causing the one or more processors to perform the operations of sensing a remaining battery life and based on the sensing, prioritizing one or more of the functions of always on recording, biometric measuring, biometric recording, sound pressure level measuring, voice activity detection, key word detection, key word analysis, personal audio assistant functions, transmission of data to a tethered phone, transmission of data to a server, transmission of data to a cloud device.

20 Claims, 10 Drawing Sheets

Related U.S. Application Data continuation of application No. 17/096,949, filed on Nov. 13, 2020, now Pat. No. 11,595,762, which is a continuation of application No. 16/839,953, filed on Apr. 3, 2020, now Pat. No. 10,904,674, which is a continuation of application No. 15/413,403, filed on Jan. 23, 2017, now Pat. No. 10,616,693.

(60) Provisional application No. 62/281,880, filed on Jan. 22, 2016.

(52) U.S. Cl.
CPC ...... *H04R 2225/55* (2013.01); *H04R 2460/03* (2013.01); *H04R 2460/13* (2013.01)

(56) References Cited

U.S. PATENT DOCUMENTS 4,054,749 A 10/1977 Suzuki et al.
4,088,849 A 5/1978 Usami et al.
4,947,440 A 8/1990 Bateman et al.
5,208,867 A 5/1993 Stites, III
5,251,263 A 10/1993 Andrea
5,267,321 A 11/1993 Langberg
5,276,740 A 1/1994 Inanaga et al.
5,317,273 A 5/1994 Hanson
5,327,506 A 7/1994 Stites
5,524,056 A 6/1996 Killion et al.
5,550,923 A 8/1996 Hotvet
5,577,511 A 11/1996 Killion
5,903,868 A 5/1999 Yuen et al.
5,923,624 A 7/1999 Groeger
5,933,510 A 8/1999 Bryant
5,946,050 A 8/1999 Wolff
6,005,525 A 12/1999 Kivela
6,021,207 A 2/2000 Puthuff et al.
6,021,325 A 2/2000 Hall
6,028,514 A 2/2000 Lemelson
6,056,698 A 5/2000 Iseberg
6,118,877 A 9/2000 Lindemann
6,163,338 A 12/2000 Johnson et al.
6,163,508 A 12/2000 Kim et al.
6,226,389 B1 5/2001 Lemelson et al.
6,298,323 B1 10/2001 Kaemmerer
6,359,993 B2 3/2002 Brimhall
6,400,652 B1 6/2002 Goldberg et al.
6,408,272 B1 6/2002 White
6,415,034 B1 7/2002 Hietanen
6,567,524 B1 5/2003 Svean et al.
6,606,598 B1 8/2003 Holthouse
6,639,987 B2 10/2003 McIntosh
6,647,368 B2 11/2003 Nemirovski
RE38,351 E 12/2003 Iseberg et al.
6,661,901 B1 12/2003 Svean et al.
6,728,385 B2 4/2004 Kvaloy et al.
6,738,482 B1 5/2004 Jaber
6,748,238 B1 6/2004 Lau
6,754,359 B1 6/2004 Svean et al.
6,804,638 B2 10/2004 Fiedler
6,804,643 B1 10/2004 Kiss
7,003,099 B1 2/2006 Zhang
7,039,195 B1 5/2006 Svean
7,039,585 B2 5/2006 Wilmot
7,050,592 B1 5/2006 Iseberg
7,072,482 B2 7/2006 Van Doorn et al.
7,107,109 B1 9/2006 Nathan et al.
7,158,933 B2 1/2007 Balan
7,177,433 B2 2/2007 Sibbald
7,209,569 B2 4/2007 Boesen
7,280,849 B1 10/2007 Bailey
7,430,299 B2 9/2008 Armstrong et al.
7,433,714 B2 10/2008 Howard et al.
7,444,353 B1 10/2008 Chen
7,450,730 B2 11/2008 Bertg et al.
7,464,029 B2 12/2008 Visser
7,477,756 B2 1/2009 Wickstrom et al.
7,512,245 B2 3/2009 Rasmussen
7,529,379 B2 5/2009 Zurek
7,562,020 B2 7/2009 Le et al.
7,574,917 B2 8/2009 Von Dach
7,756,281 B2 7/2010 Goldstein et al.
7,756,285 B2 7/2010 Sjursen et al.
7,778,434 B2 8/2010 Juneau et al.
7,853,031 B2 12/2010 Hamacher
7,903,825 B1 3/2011 Melanson
7,903,826 B2 3/2011 Boersma
7,920,557 B2 4/2011 Moote
7,936,885 B2 5/2011 Frank
7,983,907 B2 7/2011 Visser
8,014,553 B2 9/2011 Radivojevic et al.
8,018,337 B2 9/2011 Jones
8,045,840 B2 10/2011 Murata
8,047,207 B2 11/2011 Perez et al.
8,086,093 B2 12/2011 Stuckman
8,140,325 B2 3/2012 Kanevsky
8,150,044 B2 4/2012 Goldstein
8,160,261 B2 4/2012 Schulein
8,160,273 B2 4/2012 Visser
8,162,846 B2 4/2012 Epley
8,189,803 B2 5/2012 Bergeron
8,194,864 B2 6/2012 Goldstein et al.
8,199,919 B2 6/2012 Goldstein et al.
8,208,644 B2 6/2012 Goldstein et al.
8,208,652 B2 6/2012 Keady
8,218,784 B2 7/2012 Schulein
8,221,861 B2 7/2012 Keady
8,229,128 B2 7/2012 Keady
8,251,925 B2 8/2012 Keady et al.
8,254,591 B2 8/2012 Goldstein
8,270,629 B2 9/2012 Bothra
8,312,960 B2 11/2012 Keady
8,401,200 B2 3/2013 Tiscareno
8,437,492 B2 5/2013 Goldstein et al.
8,477,955 B2 7/2013 Engle
8,493,204 B2 7/2013 Wong et al.
8,550,206 B2 10/2013 Keady et al.
8,554,350 B2 10/2013 Keady et al.
8,577,062 B2 11/2013 Goldstein
8,600,067 B2 12/2013 Usher et al.
8,611,560 B2 12/2013 Goldstein
8,625,818 B2 1/2014 Stultz
8,631,801 B2 1/2014 Keady
8,657,064 B2 2/2014 Staab et al.
8,678,011 B2 3/2014 Goldstein et al.
8,718,305 B2 5/2014 Usher
8,718,313 B2 5/2014 Keady
8,750,295 B2 6/2014 Liron
8,774,433 B2 7/2014 Goldstein
8,798,278 B2 8/2014 Isabelle
8,848,939 B2 9/2014 Keady et al.
8,851,372 B2 10/2014 Zhou
8,855,343 B2 10/2014 Usher
8,917,880 B2 12/2014 Goldstein et al.
8,917,894 B2 12/2014 Goldstein
8,983,081 B2 3/2015 Bayley
8,992,710 B2 3/2015 Keady
9,013,351 B2 4/2015 Park
9,037,458 B2 5/2015 Park et al.
9,053,697 B2 6/2015 Park
9,112,701 B2 8/2015 Sano
9,113,240 B2 8/2015 Ramakrishman
9,113,267 B2 8/2015 Usher et al.
9,123,323 B2 9/2015 Keady
9,123,343 B2 9/2015 Kurki-Suonio
9,135,797 B2 9/2015 Couper et al.
9,138,353 B2 9/2015 Keady
9,185,481 B2 11/2015 Goldstein et al.
9,191,740 B2 11/2015 McIntosh
9,196,247 B2 11/2015 Harada
9,216,237 B2 12/2015 Keady
9,491,542 B2 11/2016 Usher
9,539,147 B2 1/2017 Keady et al.
9,628,896 B2 4/2017 Ichimura
9,684,778 B2 6/2017 Tharappel

(56) References Cited

U.S. PATENT DOCUMENTS

| | | | | |
|---|---|---|---|---|
| 9,757,069 | B2 | 9/2017 | Keady et al. | |
| 9,781,530 | B2 | 10/2017 | Usher et al. | |
| 9,843,854 | B2 | 12/2017 | Keady | |
| 10,012,529 | B2 | 7/2018 | Goldstein et al. | |
| 10,142,332 | B2 | 11/2018 | Ravindran | |
| 10,190,904 | B2 | 1/2019 | Goldstein et al. | |
| 10,694,277 | B2 * | 6/2020 | McGary | G06F 3/165 |
| 10,709,339 | B1 | 7/2020 | Lusted | |
| 10,970,375 | B2 | 4/2021 | Manikantan | |
| 2001/0046304 | A1 | 11/2001 | Rast | |
| 2002/0076057 | A1 | 6/2002 | Voix | |
| 2002/0098878 | A1 | 7/2002 | Mooney | |
| 2002/0106091 | A1 | 8/2002 | Furst et al. | |
| 2002/0111798 | A1 | 8/2002 | Huang | |
| 2002/0118798 | A1 | 8/2002 | Langhart et al. | |
| 2002/0165719 | A1 | 11/2002 | Wang | |
| 2002/0193130 | A1 | 12/2002 | Yang | |
| 2003/0033152 | A1 | 2/2003 | Cameron | |
| 2003/0035551 | A1 | 2/2003 | Light | |
| 2003/0130016 | A1 | 7/2003 | Matsuura | |
| 2003/0152359 | A1 | 8/2003 | Kim | |
| 2003/0161097 | A1 | 8/2003 | Le et al. | |
| 2003/0165246 | A1 | 9/2003 | Kvaloy et al. | |
| 2003/0165319 | A1 | 9/2003 | Barber | |
| 2003/0198359 | A1 | 10/2003 | Killion | |
| 2004/0042103 | A1 | 3/2004 | Mayer | |
| 2004/0086138 | A1 | 5/2004 | Kuth | |
| 2004/0109579 | A1 | 6/2004 | Izuchi | |
| 2004/0109668 | A1 | 6/2004 | Stuckman | |
| 2004/0125965 | A1 | 7/2004 | Alberth, Jr. et al. | |
| 2004/0133421 | A1 | 7/2004 | Burnett | |
| 2004/0190737 | A1 | 9/2004 | Kuhnel et al. | |
| 2004/0196992 | A1 | 10/2004 | Ryan | |
| 2004/0202339 | A1 | 10/2004 | OBrien | |
| 2004/0202340 | A1 | 10/2004 | Armstrong | |
| 2004/0203351 | A1 | 10/2004 | Shearer et al. | |
| 2004/0264938 | A1 | 12/2004 | Felder | |
| 2005/0028212 | A1 | 2/2005 | Laronne | |
| 2005/0058313 | A1 | 3/2005 | Victorian | |
| 2005/0068171 | A1 | 3/2005 | Kelliher | |
| 2005/0071158 | A1 | 3/2005 | Byford | |
| 2005/0078838 | A1 | 4/2005 | Simon | |
| 2005/0102142 | A1 | 5/2005 | Soufflet | |
| 2005/0123146 | A1 | 6/2005 | Voix et al. | |
| 2005/0207605 | A1 | 9/2005 | Dehe | |
| 2005/0227674 | A1 | 10/2005 | Kopra | |
| 2005/0281422 | A1 | 12/2005 | Armstrong | |
| 2005/0281423 | A1 | 12/2005 | Armstrong | |
| 2005/0283369 | A1 | 12/2005 | Clauser et al. | |
| 2005/0288057 | A1 | 12/2005 | Lai et al. | |
| 2006/0064037 | A1 | 3/2006 | Shalon et al. | |
| 2006/0067551 | A1 | 3/2006 | Cartwright et al. | |
| 2006/0083387 | A1 | 4/2006 | Emoto | |
| 2006/0083390 | A1 | 4/2006 | Kaderavek | |
| 2006/0083395 | A1 | 4/2006 | Allen et al. | |
| 2006/0092043 | A1 | 5/2006 | Lagassey | |
| 2006/0140425 | A1 | 6/2006 | Berg | |
| 2006/0154642 | A1 | 7/2006 | Scannell | |
| 2006/0167687 | A1 | 7/2006 | Kates | |
| 2006/0173563 | A1 | 8/2006 | Borovitski | |
| 2006/0182287 | A1 | 8/2006 | Schulein | |
| 2006/0188075 | A1 | 8/2006 | Peterson | |
| 2006/0188105 | A1 | 8/2006 | Baskerville | |
| 2006/0195322 | A1 | 8/2006 | Broussard et al. | |
| 2006/0204014 | A1 | 9/2006 | Isenberg et al. | |
| 2006/0264176 | A1 | 11/2006 | Hong | |
| 2006/0287014 | A1 | 12/2006 | Matsuura | |
| 2007/0003090 | A1 | 1/2007 | Anderson | |
| 2007/0014423 | A1 | 1/2007 | Darbut | |
| 2007/0021958 | A1 | 1/2007 | Visser et al. | |
| 2007/0036377 | A1 | 2/2007 | Stirnemann | |
| 2007/0043563 | A1 | 2/2007 | Comerford et al. | |
| 2007/0086600 | A1 | 4/2007 | Boesen | |
| 2007/0092087 | A1 | 4/2007 | Bothra | |
| 2007/0100637 | A1 | 5/2007 | McCune | |
| 2007/0143820 | A1 | 6/2007 | Pawlowski | |
| 2007/0160243 | A1 | 7/2007 | Dijkstra | |
| 2007/0189544 | A1 | 8/2007 | Rosenberg | |
| 2007/0223717 | A1 | 9/2007 | Boersma | |
| 2007/0253569 | A1 | 11/2007 | Bose | |
| 2007/0255435 | A1 | 11/2007 | Cohen | |
| 2007/0291953 | A1 | 12/2007 | Ngia et al. | |
| 2008/0037801 | A1 | 2/2008 | Alves et al. | |
| 2008/0063228 | A1 | 3/2008 | Mejia | |
| 2008/0101638 | A1 | 5/2008 | Ziller | |
| 2008/0130728 | A1 | 6/2008 | Burgan et al. | |
| 2008/0130908 | A1 | 6/2008 | Cohen | |
| 2008/0137873 | A1 | 6/2008 | Goldstein | |
| 2008/0145032 | A1 | 6/2008 | Lindroos | |
| 2008/0159547 | A1 | 7/2008 | Schuler | |
| 2008/0165988 | A1 | 7/2008 | Terlizzi et al. | |
| 2008/0221880 | A1 | 9/2008 | Cerra et al. | |
| 2009/0010456 | A1 | 1/2009 | Goldstein et al. | |
| 2009/0024234 | A1 | 1/2009 | Archibald | |
| 2009/0071487 | A1 | 3/2009 | Keady | |
| 2009/0076821 | A1 | 3/2009 | Brenner | |
| 2009/0085873 | A1 | 4/2009 | Betts | |
| 2009/0122996 | A1 | 5/2009 | Klein | |
| 2009/0286515 | A1 | 11/2009 | Othmer | |
| 2010/0061564 | A1 | 3/2010 | Clemow et al. | |
| 2010/0119077 | A1 | 5/2010 | Platz | |
| 2010/0241256 | A1 | 9/2010 | Goldstein et al. | |
| 2010/0296668 | A1 | 11/2010 | Lee et al. | |
| 2010/0316033 | A1 | 12/2010 | Atwal | |
| 2010/0328224 | A1 | 12/2010 | Kerr et al. | |
| 2011/0055256 | A1 | 3/2011 | Phillips | |
| 2011/0096939 | A1 | 4/2011 | Ichimura | |
| 2011/0116643 | A1 | 5/2011 | Tiscareno | |
| 2011/0187640 | A1 | 8/2011 | Jacobsen et al. | |
| 2011/0264447 | A1 | 10/2011 | Visser et al. | |
| 2011/0293103 | A1 | 12/2011 | Park et al. | |
| 2012/0170412 | A1 | 7/2012 | Calhoun | |
| 2013/0098706 | A1 | 4/2013 | Keady | |
| 2013/0149192 | A1 | 6/2013 | Keady | |
| 2013/0210397 | A1 | 8/2013 | Nakajima | |
| 2014/0003644 | A1 | 1/2014 | Keady et al. | |
| 2014/0023203 | A1 | 1/2014 | Rotschild | |
| 2014/0026665 | A1 | 1/2014 | Keady | |
| 2014/0089672 | A1 | 3/2014 | Luna | |
| 2014/0122092 | A1 | 5/2014 | Goldstein | |
| 2014/0163976 | A1 | 6/2014 | Park | |
| 2014/0249853 | A1 | 9/2014 | Proud et al. | |
| 2014/0373854 | A1 | 12/2014 | Keady | |
| 2015/0215701 | A1 | 7/2015 | Usher | |
| 2016/0015568 | A1 | 1/2016 | Keady | |
| 2016/0058378 | A1 | 3/2016 | Wisby et al. | |
| 2016/0104452 | A1 | 4/2016 | Guan et al. | |
| 2016/0192077 | A1 | 6/2016 | Keady | |
| 2016/0295311 | A1 | 10/2016 | Keady et al. | |
| 2017/0112671 | A1 | 4/2017 | Goldstein | |
| 2017/0134865 | A1 | 5/2017 | Goldstein et al. | |
| 2017/0164089 | A1 * | 6/2017 | Lee | H04R 1/1025 |
| 2018/0054668 | A1 | 2/2018 | Keady | |
| 2018/0132048 | A1 | 5/2018 | Usher et al. | |
| 2018/0160010 | A1 | 6/2018 | Kaiho et al. | |
| 2018/0220239 | A1 | 8/2018 | Keady et al. | |
| 2019/0038224 | A1 | 2/2019 | Zhang | |
| 2019/0082272 | A9 | 3/2019 | Goldstein et al. | |
| 2023/0419961 | A1 * | 12/2023 | Suskind | G10L 15/16 |

FOREIGN PATENT DOCUMENTS

| | | | |
|---|---|---|---|
| EP | 1519625 | A2 | 3/2005 |
| EP | 1640972 | | 3/2006 |
| JP | H0877468 | | 3/1996 |
| JP | H10162283 | | 6/1998 |
| JP | 3353701 | | 12/2002 |
| WO | WO9326085 | | 12/1993 |
| WO | 2004114722 | | 12/2004 |
| WO | 2006037156 | A1 | 4/2006 |
| WO | 2006054698 | | 5/2006 |
| WO | 2007092660 | | 8/2007 |

(56) References Cited

FOREIGN PATENT DOCUMENTS

| | | |
|---|---|---|
| WO | 2008050583 | 5/2008 |
| WO | 2009023784 | 2/2009 |
| WO | 2012097150 | 7/2012 |

OTHER PUBLICATIONS

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.
Mauro Dentino, John M. McCool, and Bernard Widrow, Adaptive Filtering in the Frequency Domain, Proceedings of the IEEE, vol. 66, No. 12, Dec. 1978.
*Samsung Electronics Co., Ltd., and Samsung Electronics, America, Inc.*, v. *Staton Techiya, LLC,* IPR2022-00282, Dec. 21, 2021.
*Samsung Electronics Co., Ltd., and Samsung Electronics, America, Inc.*, v. *Staton Techiya, LLC,* IPR2022-00242, Dec. 23, 2021.
*Samsung Electronics Co., Ltd., and Samsung Electronics, America, Inc.*, v. *Staton Techiya, LLC,* IPR2022-00243, Dec. 23, 2021.
*Samsung Electronics Co., Ltd., and Samsung Electronics, America, Inc.*, v. *Staton Techiya, LLC,* IPR2022-00234, Dec. 21, 2021.
*Samsung Electronics Co., Ltd., and Samsung Electronics, America, Inc.*, v. *Staton Techiya, LLC,* IPR2022-00253, Jan. 18, 2022.
*Samsung Electronics Co., Ltd., and Samsung Electronics, America, Inc.*, v. *Staton Techiya, LLC,* IPR2022-00324, Jan. 13, 2022.
*Samsung Electronics Co., Ltd., and Samsung Electronics, America, Inc.*, v. *Staton Techiya, LLC,* IPR2022-00281, Jan. 18, 2022.
*Samsung Electronics Co., Ltd., and Samsung Electronics, America, Inc.*, v. *Staton Techiya, LLC,* IPR2022-00302, Jan. 13, 2022.
*Samsung Electronics Co., Ltd., and Samsung Electronics, America, Inc.*, v. *Staton Techiya, LLC,* IPR2022-00369, Feb. 18, 2022.
*Samsung Electronics Co., Ltd., and Samsung Electronics, America, Inc.*, v. *Staton Techiya, LLC,* IPR2022-00388, Feb. 18, 2022.
*Samsung Electronics Co., Ltd., and Samsung Electronics, America, Inc.*, v. *Staton Techiya, LLC,* IPR2022-00410, Feb. 18, 2022.
*Samsung Electronics Co., Ltd., and Samsung Electronics, America, Inc.*, v. *Staton Techiya, LLC,* IPR2022-01078, Jun. 9, 2022.
*Samsung Electronics Co., Ltd., and Samsung Electronics, America, Inc.*, v. *Staton Techiya, LLC,* IPR2022-01099, Jun. 9, 2022.
*Samsung Electronics Co., Ltd., and Samsung Electronics, America, Inc.*, v. *Staton Techiya, LLC,* IPR2022-01106, Jun. 9, 2022.
*Samsung Electronics Co., Ltd., and Samsung Electronics, America, Inc.*, v. *Staton Techiya, LLC,* IPR2022-01098, Jun. 9, 2022.
U.S. Appl. No. 90/015,146, Samsung Electronics Co., Ltd. and Samsung Electronics, America, Inc., Request for Ex Parte Reexamination of U.S. Pat. No. 10,979,836.
U.S. Appl. No. 90/019,169, Samsung Electronics Co., Ltd. and Samsung Electronics, America, Inc., Request for Ex Parte Reexamination of U.S. Pat. No. 11,244,666.
De Jong et al., "Experimental Exploration of the Soft Tissue Conduction Pathway from Skin Stimulation Site to Inner Ear," Annals of Otology, Rhinology & Laryngology, Sep. 2012, pp. 1-2.
Wikipedia, "Maslow's Hierarchy of Needs . . . ," Printed Jan. 27, 2016, pp. 1-8.
Dauman, "Bone conduction: An explanation for this phenomenon comprising complex mechanisms," European Annals of Otorhinolaryngology, Head and Neck Diseases vol. 130, Issue 4, Sep. 2013, pp. 209-213.
Yuan et al., "Towards an Integrated Understanding of Speaking Rate in Conversation," Dept. of Linguistics, Linguistic Data Consortium, U. Penn., pp. 1-4.
Mehl et al., "Are Women Really More Talkative Than Men," Science Magazine, vol. 317, Jul. 6, 2007.

* cited by examiner

Hierarchy for Power/Efficiency functions among Earpiece(s) and Other devices

100

270

Device usage 700 FIG. 7

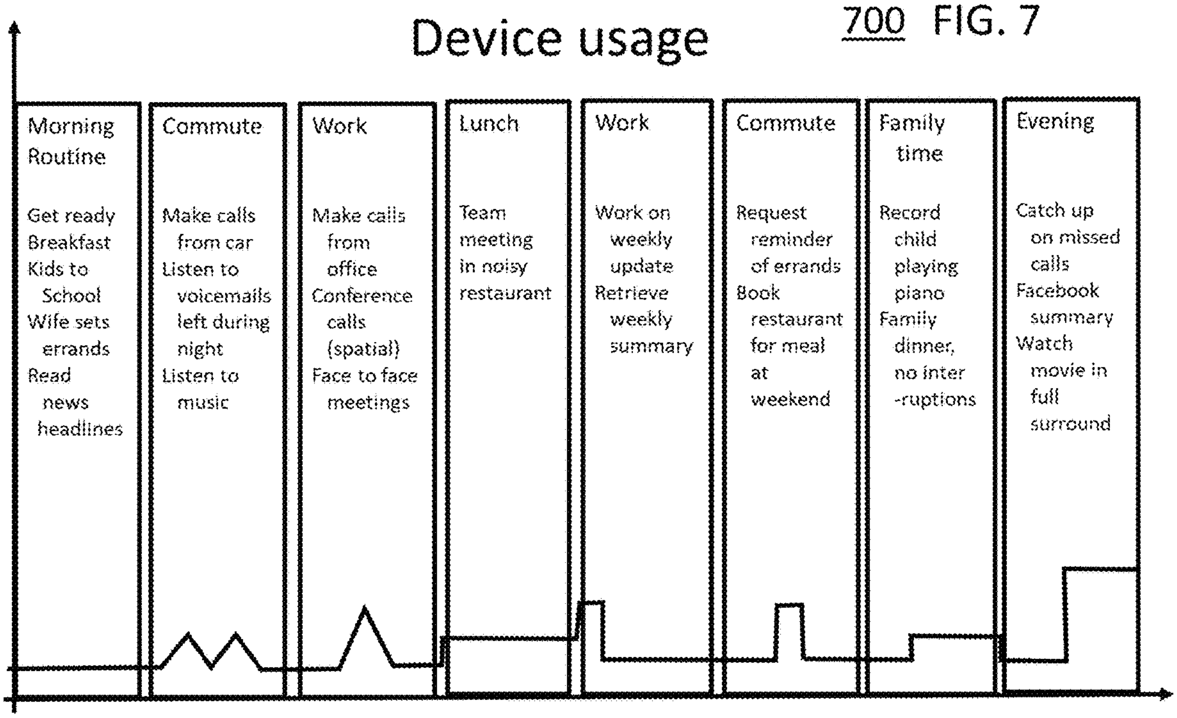

Example device usage modes 800 FIG. 8

| Device mode | Description | Power usage | Duration (14hrs) |
|---|---|---|---|
| Passthrough | Ambient sound passthrough. Idle Mode | Very Low | 14 |
| Voice capture | User's voice only. Stored locally. | Low | 3 |
| Ambient capture | Binaural capture of ambient sound. Stored locally | Low | 0.1 |
| Commands | Command recognition. Connect to phone. | Low | 0.1 |
| Data transfer | Speech, Ambient, Biometric data transfer | Medium | 0.2 |
| Voice Call | Bidirectional voice connection (eSCO). | Medium | 2 |
| Advanced Voice Call | Bidirectional stereo voice connection (eSCO). | Medium | 2 |
| Media | Music playback | High | 0.5 |
| Advanced Media/ VR/AR | Immersive binaural media. Head tracking. | Very High | 0 to 0.5 |

900

SYSTEM AND METHOD FOR EFFICIENCY AMONG DEVICES

CROSS-REFERENCE TO RELATED APPLICATION(S)

This application is a continuation of and claims priority to U.S. patent application Ser. No. 18/085,542 filed 20 Dec. 2022, which is a continuation of and claims priority to U.S. patent application Ser. No. 17/096,949 filed 13 Nov. 2020, which is a continuation of and claims priority to U.S. patent application Ser. No. 16/839,953, filed 3 Apr. 2020, which is a continuation of and claims priority to U.S. patent application Ser. No. 15/413,403, filed on Jan. 23, 2017, which claims the benefit of U.S. Provisional Patent Application Ser. No. 62/281,880, filed on Jan. 22, 2016, each of which are herein incorporated by reference in their entireties.

FIELD OF THE INVENTION

The present embodiments relate to efficiency among devices and more particularly to methods, systems and devices efficiently storing and transmitting or receiving information among such devices.

BACKGROUND OF THE INVENTION

As our devices begin to track more and more of our data, efficient methods and systems of transporting such data between devices and systems must improve to overcome the existing battery life limitations. The battery life limitations are all the more prevalent in mobile devices and become even more prevalent as devices become smaller and include further or additional functionality.

BRIEF DESCRIPTION OF THE DRAWINGS

FIG. 7 is a chart illustrating device usage for a typical day with example activities in accordance with an embodiment;

FIG. 8 is a chart illustrating device power usage based on modes in accordance with an embodiment;

DETAILED DESCRIPTION

Figure 1:
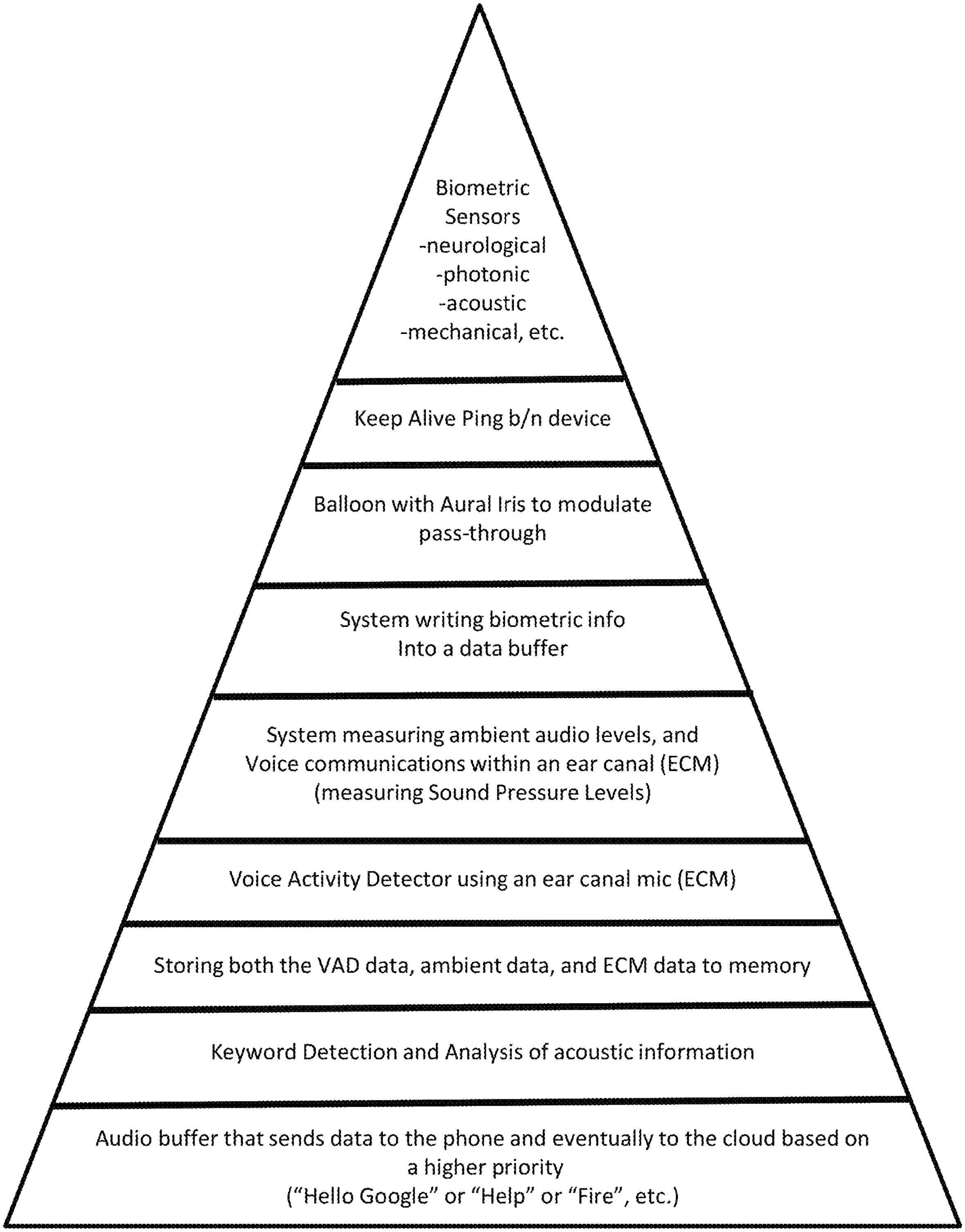
FIG. 1 is a depiction of a hierarchy for power/efficiency functions among earpiece(s) and other device in accordance with an embodiment.

Communications and protocols for use in a low energy system from one electronic device to another such as an earpiece to a phone, or from a pair of earpieces to a phone, or from a phone to a server or cloud, or from a phone to an earpiece or from a phone to a pair of earpieces can impact battery life in numerous ways. Earpieces or earphones or earbuds or headphones are just one example of a device that is getting smaller and including additional functionality. The embodiments are not limited to an earpiece, but used as an example to demonstrate a dynamic power management scheme. As earpieces begin to include additional functionality, a hierarchy of power or efficiency of functions should be considered in developing a system that will operate in an optimal manner. In the case of an earpiece, such system can take advantage of the natural capabilities of the ear to deal with sound processing, but only to the extent that noise levels do not exceed such natural capabilities. Such a hierarchy 100 for earpieces as illustrated in FIG. 1 can take into account the different power requirements and priorities that could be encountered as a user utilizes such a multi-functional device such as an earpiece. The diagram assumes that the earpiece includes a full complement of functions including always on recording, biometric measuring and recording, sound pressure level measurements from both an ambient microphone and an ear canal microphone, voice activity detection, key word detection and analysis, personal audio assistant functions, transmission of data to a phone or a server or cloud device, among many other functions. A different hierarchy can be developed for other devices that are in communication and such hierarchy can be dynamically modified based on the functions and requirements based on the desired goals. In many instances among mobile devices, efficiency or management of limited power resources will typically be a goal, while in other systems reduced latency or high quality voice or robust data communications might be a primary goal or an alternative or additional secondary goal. Most of the examples provided are focused on dynamic power management.

In one use case, for example, if one is on the phone and the phone is not fully charged (or otherwise low on power) and the user wants to send a message out, the device can be automatically configured to avoid powering up the screen and to send the message acoustically. The acoustic message is sent (either with or without performing voice to text) rather than sending a text message that would require the powering up of the screen. Sending the acoustic message would typically require less energy since there is no need to turn on the screen.

As shown above, the use case will dictate the power required which can be modified based on the remaining battery life. In other words, the battery power or life can dictate what medium or protocol used for communication. One medium or protocol (CDMA vs. VoiP, for example which have different bandwidth requirements and respective battery requirements) can be selected over another based on the remaining battery life. In one example, a communication channel can normally be optimized for high fidelity requires higher bandwidth and higher power consumption. If a system recognizes that a mobile device is limited in battery life, the system can automatically switch the communication channel to another protocol or mode that does not provide high fidelity (but yet still provides adequate sound quality) and thereby extending the remaining battery life for the mobile device.

In some embodiments, the methods herein can involve passing operations involving intensive processing to another device that may not have limited resources. For example, if an earpiece is limited in resources in terms of power or processing or otherwise, then the audio processing or other processing needed can be shifted or passed off to a phone or other mobile device for processing. Similarly, if the phone or mobile device fails to have sufficient resources, the phone or mobile device can pass off or shift the processing to a server or on to the cloud where resources are presumably not limited. In essence, the processing can be shifted or distributed between the edges of the system (e.g., the earpiece) and central portion of the system (e.g., in the cloud) (and in-between, e.g., the phone in this example) based on the available resources and needed processing.

In some embodiments, the Bluetooth communication protocol or other radio frequency (RF), or optical, or magnetic resonance communication systems can change dynamically based either on the client/slave or master battery or energy life remaining or available. In this regard, the embodiments can have significant impact of the useful life of devices on not only devices involved in voice communications, but in the "Internet of Things" where devices are interconnected in numerous ways to each other and to individuals.

The hierarchy 100 shown in a form of a pyramid in the FIG. 1 includes functions that presumably use less energy at the top of the pyramid to functions towards the bottom of the pyramid that cause the most battery drain in such a system. At the top are low energy functions such as biometric monitoring functions. The various biometric monitoring functions themselves can also have a hierarchy of efficiency of their own as each biometric sensor may require more energy than others. For example, one hierarchy of biometric sensors could include neurological sensors, photonic sensors, acoustic sensors and then mechanical sensors. Of course, such ordering can be re-arranged based on the actual battery consumption/drain such sensors cause. The next level in the hierarchy could include receiving or transmitting pinging signals to determine connectivity between devices (such as provided in the Bluetooth protocol). Note, that the embodiments herein are not limited to Bluetooth protocols and other embodiments are certainly contemplated. For example, a closed or proprietary system may use a completely new communication protocol that can be designed for greater efficiency using the dynamic power schemes represented by the hierarchical diagram above. Furthermore, the connectivity to multiple devices can be assessed to determine the optimal method of transferring captured data out of the ear pieces, e.g. if the wearer is not in close proximity to their mobile phone, the ear piece may determine to use a different available connection, or none at all.

When an earpiece includes an "aural iris" for example, such a device can be next on the hierarchy. An aural iris acts as a valve or modulates the amount of ambient sound that passes through to the ear canal (via an ear canal receiver or speaker, for example), which, by itself provides ample battery opportunities for savings in terms of processing and power consumption as will be further explained below. An aural iris can be implemented in a number of ways including the use of an electroactive polymer or EAP or with MEMs devices or other electronic devices.

With respect to the "Aural Iris", note that the embodiments are not necessarily limited to using an EAP valve and that various embodiments will generally revolve around five (5) different embodiments or aspects that may alter the status of the aural iris with the hierarchy:

1. Pure attenuation for safety purposes. Rapid or quick response time by the "iris" in the order of magnitude of 10 s of milliseconds will help prevent hearing loss (SPL damage) in cases of noise bursts. The response time of the iris device can be metered by knowing the noise reduction rating (NRR) of the balloon (or other occluding device being used). The iris can help with various sources of noise induced hearing loss or NIHL. One source or cause of NIHL is the aforementioned noise burst. Unfortunately, bursts are not the only source or cause. A second source or cause of NIHL arises from a relatively constant level of noise over a period of time. Typically the level of noise causing NIHL is an SPL level over an OSHA prescribed level over a prescribed time.

The iris can utilize its fast response time to lower the overall background noise exposure level for a user in a manner that can be imperceptible or transparent to the user. The actual SPL level can oscillate hundreds or thousands of times over the span of a day, but the iris can modulate the exposure levels to remain at or below the prescribed levels to avoid or mitigate NIHL.

2. "Iris" used for habituation by self-adjusting to enable (a hearing aid) user to acclimate over time or compensate occlusion effects.

3. Iris enables power savings by changing duty cycle of when amplifiers and other energy consuming devices need to be on. By leaving the acoustical lumen in a passive (open) and natural state for the vast majority of the time and only using active electronics in noisy environments (which presumably will be a smaller portion of most people's day), then significant power savings can be realized in real world applications. For example, in a hearing instrument, three components generally consume a significant portion of the energy resources. The amplification that delivers the sound from the speaker to the ear can consume 2 mWatts of power. A transceiver that offloads processing and data from the hearing instrument to a phone (or other portable device) and also receive such data can consume 12 mWatts of power or more. Furthermore, a processor that performs some of the processing before transmitting or after receiving data can also consume power. The iris alleviates the amount of amplification, offloading, and processing being performed by such a hearing instrument.

4. Iris preserves the overall pinna cues or authenticity of a signal. As more of an active listening mode is used (using an ambient microphone to port sound through an ear canal speaker), there is loss of authenticity of a signal due to FFTs, filter banks, amplifiers, etc. causing a more unnatural and synthetic sound. Note that phase issues will still likely occur due to the partial use of (natural) acoustics and partial use of electronic reproduction. This does not necessarily solve that issue, but just provides an OVERALL preservation of pinna cues by enabling greater use of natural acoustics. Two channels can be used.

5. Similar to #4 above . . . Iris also enables the preservation of situational awareness, particularly in the case of sharpshooters. Military believe they are "better off deaf than dead" and do not want to lose their ability to discriminate where sounds come from. When you plug both ears you are compromising pinna cues. The Iris can overcome this problem by keeping the ear (acoustically) open and only shutting the iris when the gun is fired using a very fast response time. The response time would need to be in the order of magnitude of 5 to 10 milliseconds.

The acoustic iris can be embodied in various configurations or structures with various alternative devices within the scope of the embodiments. In some embodiments, an aural iris can include a lumen having a first opening and a second opening. The iris can further include an actuator coupled to or on the first opening (or the second opening). In some embodiments, an aural iris can include the lumen with actuators respectively coupled to or on or in both openings of the lumen. In some embodiments, an actuator can be placed in or at the opening of the lumen. Preferably, the lumen can be made of flexible material such as elastomeric material to enable a snug and sealing fit to the opening as the actuator is actuated. Some embodiments can utilize a MEMs micro-actuator or micro-actuator end-effector. In some embodiments, the actuators and the conduit or tube can be several millimeters in cross-sectional diameter. The conduit or lumen will typically have an opening or opening area with a circular or oval edge and the actuator that would block or displace such opening or edges can serve to attenuate acoustic signals traveling down the acoustic conduit or lumen or tube. In some embodiments, the actuator can take the form of a vertical displacement piston or moveable platform with spherical plunger, flat plate or cone. Further note that in the case of an earpiece, the lumen has two openings including an opening to the ambient environment and an opening in the ear canal facing towards the tympanic membrane. In some embodiments, the actuators are used on or in the ambient opening and in other embodiments the actuators are used on or in the internal opening. In yet other embodiments, the actuators can be use on both openings.

End effectors using a vertical displacement piston or moveable platform with spherical plunger, flat plate or cone can require significant vertical travel (likely several hundred microns to a millimeter) to transition from fully open to fully closed position. The End-effector may travel to and potentially contact the conduit edge without being damaged or sticking to conduit edge. Vertical alignment during assembly may be a difficult task and may be yield-impacting during assembly or during use in the field. In some preferred embodiments, the actuator utilizes low-power with fast actuation stroke. Larger strokes imply longer (or slower) actuation times. A vertical displacement actuator may involve a wider acoustic conduit around the actuator to allow sound to pass around the actuator. Results may vary depending on whether the end-effector faces and actuates outwards towards the external environment and the actual end-effector shape used in a particular application. Different shapes for the end-effector can impact acoustic performance.

In some embodiments the end effector can take the form of a throttle valve or tilt mirror. In the "closed" position each of the tilt mirror members in an array of tilt mirrors would remain in a horizontal position. In an "open" position, at least one of the tilt mirror members would rotate or swivel around a single axis pivot point. Note that the throttle valve/tilt mirror design can take the form of a single tilt actuator in a grid array or use multiple (and likely smaller) tilt actuators in a grid array. In some embodiments, all the tilt actuators in a grid array would remain horizontal in a "closed" position while in an "open" position all (or some) of the tilt actuators in the grid array would tilt or rotate from the horizontal position.

Throttle Valve/Tilt-Mirror (TVTM) configurations can be simpler in design since they are planar structures that do not necessarily need to seal to a conduit edge like vertical displacement actuators. Also, a single axis tilt can be sufficient. Use of TVTM structures can avoid acoustic re-routing (wide by-pass conduit) as might be used with vertical displacement actuators. Furthermore, it is likely that TVTM configurations have smaller/faster actuation than vertical displacement actuators and likely a correspondingly lower power usage than vertical displacement actuators.

In yet other embodiments, a micro acoustic iris end-effector can take the form of a tunable grating having multiple displacement actuators in a grid array. In a closed position, all actuators are horizontally aligned. In an open position, one or more of the tunable grating actuators in the grid array would be vertically displaced. As with the TVTM configurations, the tunable grating configurations can be simpler in design since they are planar structures that do not necessarily need to seal to a conduit edge like vertical displacement actuators. Use of tunable grating structures can also avoid acoustic re-routing (wide by-pass conduit) as might be used with vertical displacement actuators. Furthermore, it is likely that tunable grating configurations have smaller/faster actuation than vertical displacement actuators and likely a correspondingly lower power usage than vertical displacement actuators.

In yet other embodiments, a micro acoustic iris end-effector can take the form of a horizontal displacement plate having multiple displacement actuators in a grid array. In a closed position, all actuators are horizontally aligned in an overlapping fashion to seal an opening. In an open position, one or more of the displacement actuators in the grid array would be horizontally displaced leaving one or more openings for acoustic transmissions. As with the TVTM configurations, the horizontal displacement configurations can be simpler in design since they are planar structures that do not necessarily need to seal to a conduit edge like vertical displacement actuators. Use of horizontal displacement plate structures can also avoid acoustic re-routing (wide by-pass conduit) as might be used with vertical displacement actuators. Furthermore, it is likely that horizontal displacement plate configurations have smaller/faster actuation than vertical displacement actuators and likely a correspondingly lower power usage than vertical displacement actuators.

In some embodiments, a micro acoustic iris end-effector can take the form of a zipping or curling actuator. In a closed position, the zipping or curling actuator member lies flat and horizontally aligned in an overlapping fashion to seal an opening. In an open position, zipping or curling actuator curls away leaving an opening for acoustic transmissions. The zipping or curling embodiments can be designed as a single actuator or multiple actuators in a grid array. The zipping actuator in an open position can take the form of a MEMS electrostatic zipping actuator with the actuators curled up. As with the TVTM configurations, the displacement configurations can be simpler in design since they are planar structures that do not necessarily need to seal to a conduit edge like vertical displacement actuators. Use of horizontal curling or zipping structures can also avoid acoustic re-routing (wide by-pass conduit) as might be used with vertical displacement actuators. Furthermore, it is likely that curling or zipping configurations have smaller/faster actuation than vertical displacement actuators and likely a correspondingly lower power usage than vertical displacement actuators.

In some embodiments, a micro acoustic iris end-effector can take the form of a rotary vane actuator. In a closed position, the rotary vane actuator member covers one or more openings to seal such openings. In an open position, rotary vane actuator rotates and leaves one or more openings exposed for acoustic transmissions. As with the TVTM configurations, the rotary vane configurations can be simpler in design since they are planar structures that do not necessarily need to seal to a conduit edge like vertical displacement actuators. Use of rotary vane structures can also avoid acoustic re-routing (wide by-pass conduit) as might be used with vertical displacement actuators. Furthermore, it is likely that rotary vane configurations have smaller/faster actuation than vertical displacement actuators and likely a correspondingly lower power usage than vertical displacement actuators.

In yet other embodiments, the micro-acoustic iris end effectors can be made of acoustic meta-materials and structures. Such meta-materials and structures can be activated to dampen acoustic signals.

Note that the embodiments are not limited to the aforementioned micro-actuator types, but can include other micro or macro actuator types (depending on the application) including, but not limited to magnetostrictive, piezoelectric, electromagnetic, electroactive polymer, pneumatic, hydraulic, thermal biomorph, state change, SMA, parallel plate, piezoelectric biomorph, electrostatic relay, curved electrode, repulsive force, solid expansion, comb drive, magnetic relay, piezoelectric expansion, external field, thermal relay, topology optimized, S-shaped actuator, distributed actuator, inchworm, fluid expansion, scratch drive, or impact actuator.

Although there are numerous modes of actuation, the modes of most promise for an acoustic iris application in an earpiece or other communication or hearing device can include piezoelectric micro-actuators and electrostatic micro-actuators.

Piezoelectric micro-actuators cause motion by piezoelectric material strain induced by an electric field. Piezoelectric micro-actuators feature low power consumption and fast actuation speeds in the micro-second through tens of microsecond range. Energy density is moderate to high. Actuation distance can be moderate or (more typically) low. Actuation voltage increases with actuation stroke and restoring-force structure spring constant. Voltage step-up Application Specific Integrated Circuits or ASICs can be used in conjunction with the actuator to provide necessary actuation voltages.

Motion can be horizontal or vertical. Actuation displacement can be amplified by using embedded lever arms/plates. Industrial actuator and sensor applications include resonators, microfluidic pumps and valves, inkjet printheads, microphones, energy harvesters, etc. Piezo-actuators require the deposition and pattern etching of piezoelectric thin films such as PZT (lead zirconate titanate with high piezo coefficients) or AlN (aluminum nitride with moderate piezo coefficients) with specific deposited crystalline orientation.

One example is a MEMS microvalve or micropump. The working principle is a volumetric membrane pump, with a pair of check valves, integrated in a MEMS chip with a sub-micron precision. The chip can be a stack of 3 layers bonded together: a silicon on insulator (SOI) plate with micro-machined pump-structures and two silicon cover plates with through-holes. This MEMS chip arrangement is assembled with a piezoelectric actuator that moves the membrane in a reciprocating movement to compress and decompress the fluid in the pumping chamber.

Electrostatic micro-actuators induce motion by attraction between oppositely charged conductors. Electrostatic micro-actuators feature low power consumption and fast actuation speeds in the micro-second through tens of microsecond range. Energy density is moderate. Actuation distance can be high or low, but actuation voltage increases with actuation stroke and restoring-force structure spring constant. Oftentimes, charge-pumps or other on-chip or adjacent chip voltage step-up ASIC's are used in conjunction with the actuator, to provide necessary actuation voltages. Motion can be horizontal, vertical, rotary or compound direction (tilting, zipping, inch-worm, scratch, etc.). Industrial actuator and sensor applications include resonators, optical and RF switches, MEMS display devices, optical scanners, cell phone camera auto-focus modules and microphones, tunable optical gratings, adaptive optics, inertial sensors, microfluidic pumps, etc. Devices can be built using semi-conductor or custom micro-electronic materials. Most volume MEMS devices are electrostatic.

One example of a MEMS electrostatic actuator is a linear comb drive that includes a polysilicon resonator fabricated using a surface micromachining process. Another example is the MEMs electrostatic zipping actuator. Yet another example of a MEMS electrostatic actuator is a MEMS tilt mirror which can a single axis or dual axis tilt mirror. Examples of tilt mirrors include Texas Instruments Digital Micro-mirror Device (DMD), the Lucent Technologies optical switch micro mirror, and the Innoluce MEMS mirror among others.

Some existing MEMS micro-actuator devices that could potentially be modified for use in an acoustic iris as discussed above include in likely order of ease of implementation and/or cost: Invensas low power vertical displacement electrostatic micro-actuator MEMS auto-focus device, using lens or later custom modified shape end-effector. (Piston Micro Acoustic Iris) Innoluce or Precisely Microtechnology single-axis MEMS tilt mirror electrostatic micro-actuator. (Throttle Valve Micro Acoustic Iris) Wavelens electrostatic MEMS fluidic lens plate micro-actuator. (Piston Micro Acoustic Iris) Debiotech piezo MEMS micro-actuator valve. (Vertical Valve Micro Acoustic Iris) Boston Micromachines—electrostatic adaptive optics module custom modified for tunable grating applications. (Tunable Grating Micro Acoustic Iris) Silex Microsystems or Innovative MicroTechnologies (IMT) MEMS foundries—custom rotary electrostatic comb actuator or motor build in SOI silicon. (Rotary Vane Micro Acoustic Iris).

Next in the hierarchy includes writing of biometric information into a data buffer. This buffer function presumably used less power than longer-term storage. The following level can include the system measuring sound pressure levels from ambient sounds via an ambient microphone, or from voice communications from an ear canal microphone. The next level can include a voice activity detector or VAD that uses an ear canal microphone. Such VAD could also optionally use an accelerometer in certain embodiments. Following the VAD functions can include storage to memory of VAD data, ambient sound data, and/or ear canal microphone data. In addition to the acoustic data, metadata is used to provide further information on content and VAD accuracy. For example, if the VAD has low confidence of speech content, the captured data can be transferred to the phone and/or the cloud to check the content using a more robust method that isn't restricted in terms of memory and processing power. The next level of the pyramid can include keyword detection and analysis of acoustic information. The last level shown includes the transmission of audio data and/or other data to the phone or cloud, particularly based on a higher priority that indicates an immediate transmission of such data. Transmissions of recognized commands or of keywords or of sounds indicative of an emergency will require greater and more immediate battery consumption than other conventional recognized keywords or of unrecognized keywords or sounds. Again, the criticality or non-criticality or priority level of the perceived meanings of such recognized keywords or sounds would alter the status of such function within this hierarchy. The keyword detection and sending of such data can utilize a "confidence metric" to determine not only the criticality of keywords themselves, but further determine whether keywords form a part of a sentence to determine criticality of the meaning of the sentence or words in context. The context or semantics of the words can be determined from not only the words themselves, but also in conjunction with sensors such as biometric sensors that can further provide an indication of criticality.

The hierarchy shown can be further refined or altered by reordering certain functions or adding or removing certain functions. The embodiments are not limited to the particular hierarchy shown in the Figure above. Some additional refinements or considerations can include: A receiver that receives confirmation of data being stored remotely such as on the cloud or on the phone or elsewhere. Anticipatory services that can be provided in almost real time Encryption of data, when stored on the earpiece, transmitted to the phone, or transmitted to the cloud, or when stored on the cloud. An SPL detector can drive an aural iris to desired levels of opened and closed. A servo system that opens and closes the aural iris use of an ear canal microphone to determine a level or quality level of sealing of the ear canal. Use of biometric sensors and measurements that fall outside of normal ranges that would require more immediate transmission of such biometric data or turning on of additional biometric sensors to determine criticality of a user's condition.

Of course, the embodiments (or hierarchy) are not limited to such a fully functional earpiece device, but can be modified and include a much simpler device that can merely include an earpiece that operates with a phone or other device (such as a fixed or non-mobile device). As some of the functionality described herein can be included in (or shifted to) the phone or other device, a whole spectrum of earpiece devices with a entire set of complex functions to a simple earpiece with just a speaker or transducer for sound reproduction can also take advantage of the techniques herein and therefore are considered part of the various embodiments. Furthermore, the embodiments include a single earpiece or a pair of earpieces. A non-limiting list of embodiments are recited as examples: a simple earpiece with a speaker, a pair of earpieces with a speaker in each earpiece of the pair, an earpiece (or pair of earpieces) with an ambient microphone, an earpiece (or pair of earpieces) with an ear canal microphone, an earpiece (or pair of earpieces) with an ambient microphone and an ear canal microphone, an earpiece (or pair of earpieces) with a speaker or speakers and any combination of one or more biometric sensors, one or more ambient microphones, one or more ear canal microphones, one or more voice activity detectors, one or more keyword detectors, one or more keyword analyzers, one or more audio or data buffers, one or more processing cores (for example, a separate core for "regular" applications and then a separate Bluetooth radio or other communication core for handling connectivity), one or more data receivers, one or more transmitters, or one or more transceivers. As noted above, the embodiments are not limited to earpieces, but can encompass or be embodied by other devices that can take advantage of hierarchical techniques noted above.

Below are described a few illustrations of the potential embodiments:

Multiple devices 201, 202, 203, etc. wirelessly coupled to each other and coupled to a mobile or fixed device 204 and further coupled to a cloud device or servers 206 (and optionally via an intermediary device 205).

Two devices 202 and 203 wirelessly coupled to each other and coupled to a mobile or fixed device 204 and further coupled to the a cloud device or servers 206 (and optionally via an intermediary device 205).

Figure 2A:
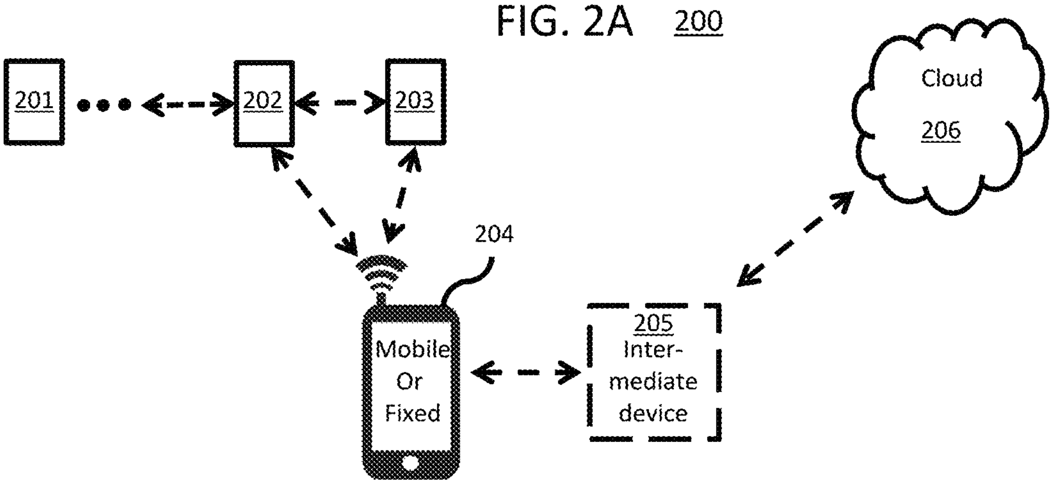
FIG. 2A is a block diagram of multiple devices wirelessly coupled to each other and coupled to a mobile or fixed device and further coupled to the cloud or servers (optionally via an intermediary device in accordance with an embodiment.
Figure 2B:
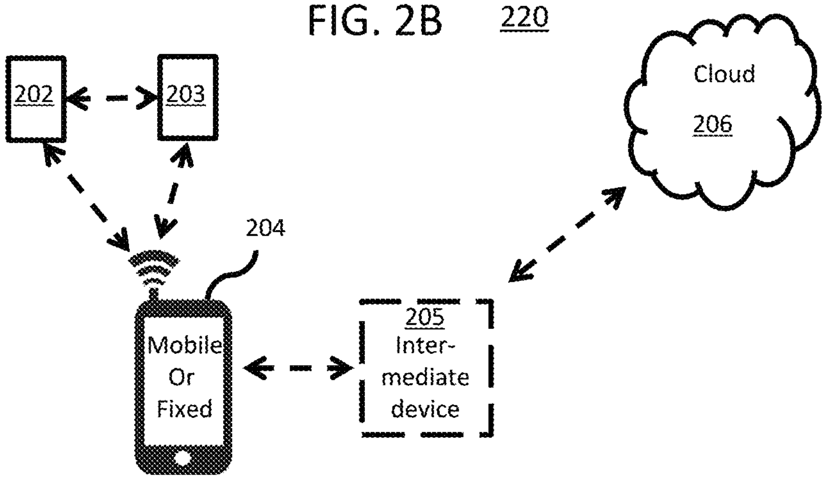
FIG. 2B is a block diagram of two devices wirelessly coupled to each other and coupled to a mobile or fixed device and further coupled to the cloud or servers (optionally via an intermediary device in accordance with an embodiment.
Figure 2C:
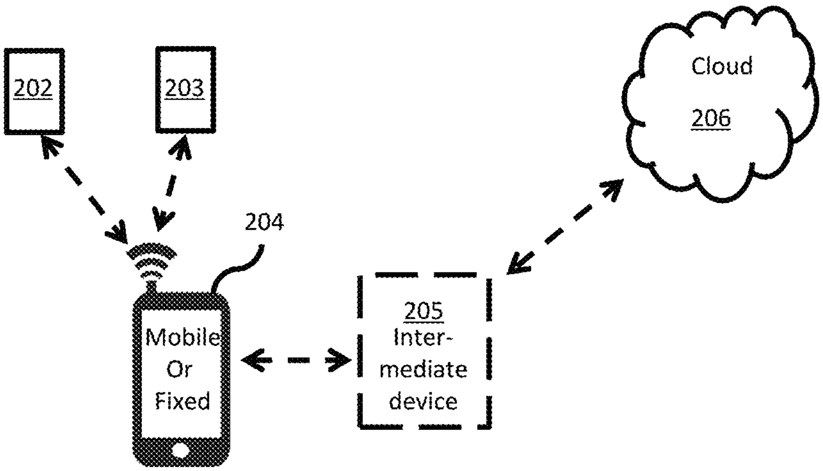
FIG. 2C is a block diagram of two independent devices each independently wirelessly coupled to a mobile or fixed device and further coupled to the cloud or servers (optionally via an intermediary device) in accordance with an embodiment.

FIG. 2C illustrates a system 230 having independent devices 202 and 203 each independently wirelessly coupled to a mobile or fixed device 204 and further coupled to the cloud or servers 206 (and optionally via an intermediary device 205).

Figure 2D:
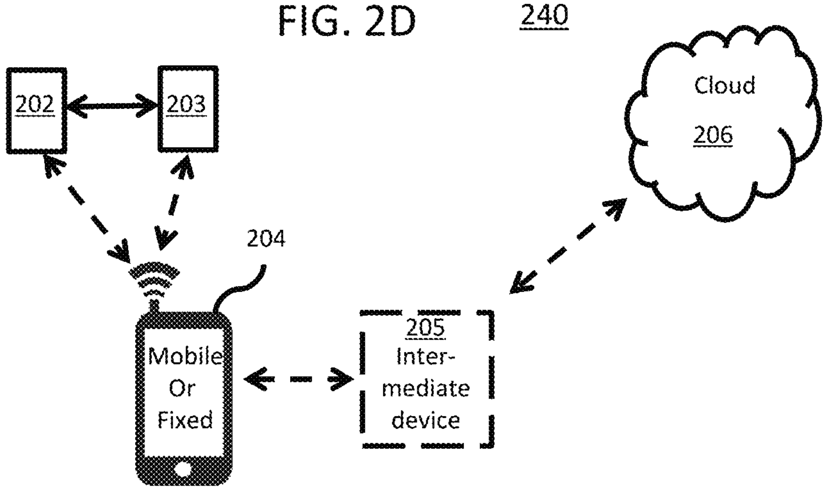
FIG. 2D is a block diagram of two devices connected to each other (wired) and coupled to a mobile or fixed device and further coupled to the cloud or servers (optionally via an intermediary device) in accordance with an embodiment.

FIG. 2D illustrates a system 240 having devices 202 and 203 connected to each other (wired) and coupled to the mobile or fixed device 204 and further coupled to the cloud or servers 206 (and optionally via an intermediary device 205).

Figure 2E:
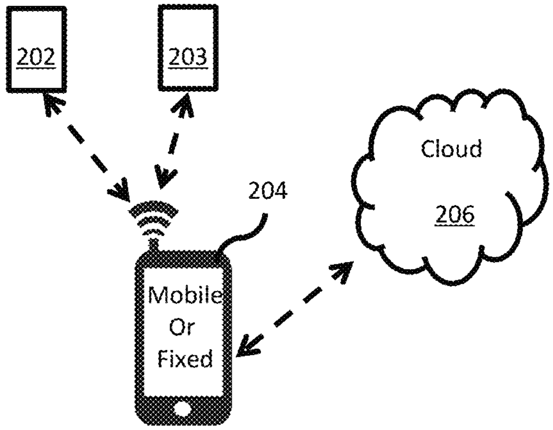
FIG. 2E is a block diagram of two independent devices each independently wirelessly coupled to a mobile or fixed device and further coupled to the cloud or servers (without an intermediary device) in accordance with an embodiment.

FIG. 2E illustrates a system 250 having the independent devices 202 and 203 each independently and wirelessly coupled to the mobile or fixed device 204 and further coupled to the cloud or servers 206 (without an intermediary device).

Figure 2F:
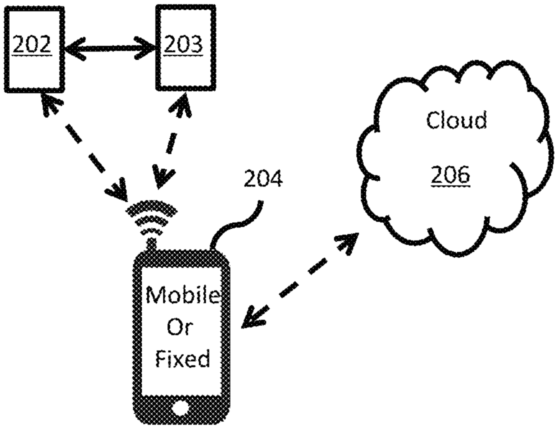
FIG. 2F is a block diagram of two devices connected to each other (wired) and coupled to a mobile or fixed device and further coupled to the cloud or servers (without an intermediary device) in accordance with an embodiment.
Figure 2G:
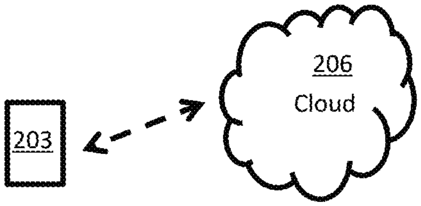
FIG. 2G is a block diagram of a device coupled to the cloud or servers (without an intermediary device) in accordance with an embodiment.

FIG. 2F illustrates a system 260 having the two devices 202 and 203 connected to each other (wired) and coupled to the mobile or fixed device 204 and further coupled to the cloud or servers 206 (without an intermediary device).

Figure 3:
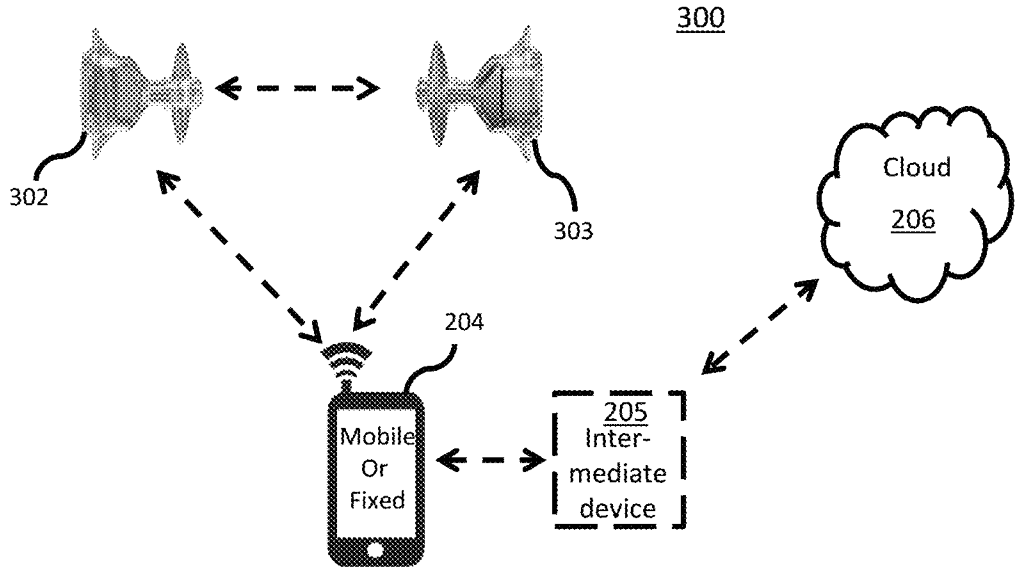
FIG. 3 is a block diagram of two devices (in the form of wireless earbuds) wirelessly coupled to each other and coupled to a mobile or fixed device and further coupled to the cloud or servers (optionally via an intermediary device) in accordance with an embodiment.

FIG. 3 illustrates a system 300 having the devices 302 and 303 (in the form of wireless earbuds left and right) wirelessly coupled to each other and coupled to a mobile or fixed device 204 and further coupled to the cloud or servers 206 (and optionally via an intermediary device 205).

Figure 4:
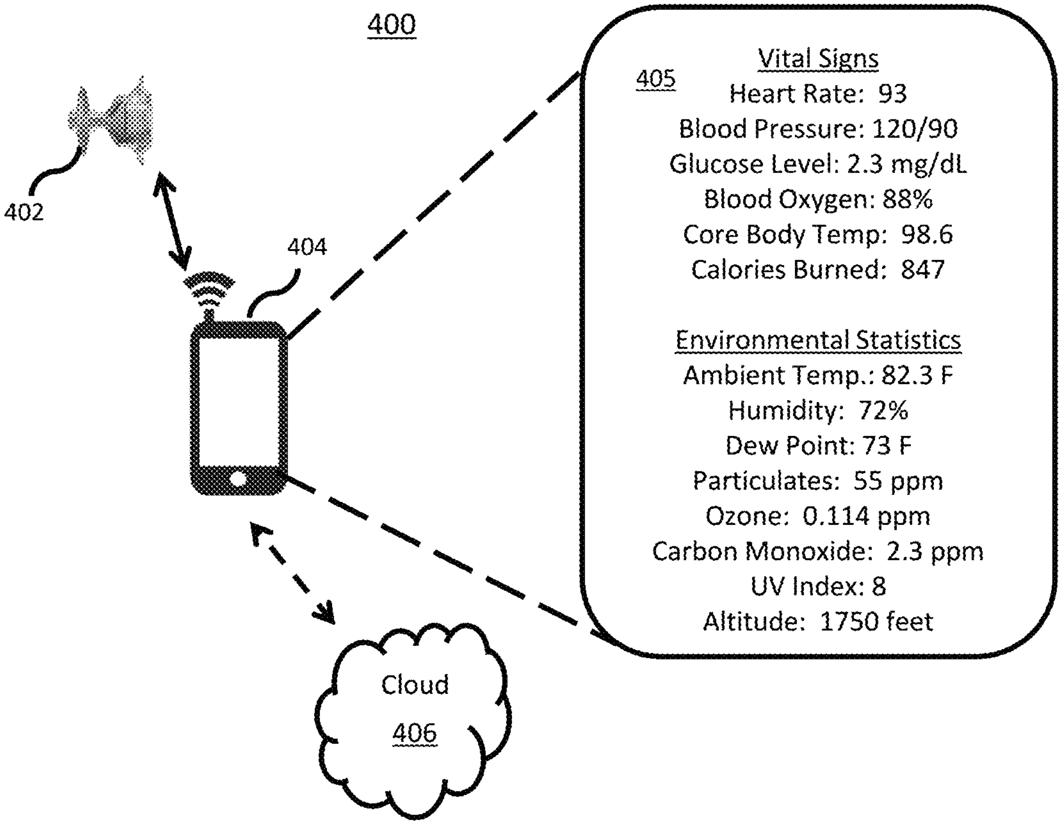
FIG. 4 is a block diagram of a single device (in the form of wireless earbud or earpiece) wirelessly coupled to a mobile or fixed device and further coupled to the cloud or server in accordance with an embodiment.

FIG. 4 illustrates a system 400 having a single device 402 (in the form of wireless earbud or earpiece) wirelessly coupled to a mobile or fixed device 404 and further coupled to the cloud or servers 406. A display on the mobile or fixed device 404 illustrates a user interface 405 that can include physiological or biometric sensor data and environmental data captured or obtained by the single device (and/or optionally captured or obtained by the mobile or fixed device). The configurations shown in FIGS. 2A-G, 3, and 4 are merely exemplary configuration within the scope of the embodiments herein and are not limited thereto to such configurations.

One technique to improve efficiency includes discontinuous transmissions or communications of data. Although an earpiece can continuously collect data (biometric, acoustic, etc.), the transmission of such data to a phone or other devices can easily exhaust the power resources at the earpiece. Thus, if there is no criticality to the transmission of the data, such data can be gathered and optionally condensed or compressed, stored, and then transmitted at a more convenient or opportune time. The data can be transmitted in various ways including transmissions as a trickle or in bursts. In the case of Bluetooth, since the protocol already sends a "keep alive" ping periodically, there may be instances where trickling the data at the same time as the "keep alive" ping may make sense. Considerations regarding the criticality of the information and the size of the data should be considered. If the data is a keyword for a command or indicative of an emergency ("Hello Google", "Fire", "Help", etc.) or a sound signature detection indicative of an emergency (shots fired, sirens, tires screeching, SPL levels exceeding a certain minimum level, etc.), then the criticality of the transmission would override battery life considerations. Another consideration is the proximity between devices. If one device cannot "see" a node, then data would need to be stored locally and resources managed accordingly.

Another technique to improve efficiency can take advantage of use of a pair of earpieces. Since each earpiece can include a separate power source, then both earpieces may not need to send data or transmit back to a phone or other device. If each earpiece has its own power source, then several factors can be considered in determining which earpiece to use to transmit back to the phone (or other device). Such factors can include, but are not limited to the strength (e.g., signal strength, RSSI) of the connection between each respective earpiece and the phone (or device), the battery life remaining in each of the earpieces, the level of speech detection by each of the earpieces, the level of noise measured by each of the earpieces, or the quality measure of a seal for each of the earpieces with the user's left and right ear canals.

In instances where more than a single battery is used for an earpiece, one battery can be dedicated to lower energy functions (and use a hearing aid battery for such uses), and one or more additional batteries can be used for the higher energy functions such as transmissions to a phone from the earpiece. Each battery can have different power and recharging cycles that can be considered to extend the overall use of the earpiece.

As discussed above, since such a system can include two buds or earpieces, the system can spread the load between each ear piece. Custom software on the phone can ping the buds every few minutes for a power level update so the system can select which one to use. Similarly, only one stream of audio is needed from the buds to the phone, and therefore 2 full connections are unnecessary. This allows the secondary device to remain at a higher (energy) level for other functions.

Since the system is bi-directional, some of the considerations in the drive for more efficient energy consumption at the earpiece can be viewed from the perspective of the device (e.g., phone, or base station or other device) communicating with the earpiece. The phone or other device should take into account the proximity of the phone to the earpiece, the signal strength, noise levels, etc. (almost mirroring the considerations of the connectivity from the earpiece to the phone).

Earpieces are not only communication devices, but also entertainment devices that receive streaming data such as streaming music. Existing protocols for streaming music include A2DP. A2DP stands for Advanced Audio Distribution Profile. This is the Bluetooth Stereo profile which defines how high quality stereo audio can be streamed from one device to another over a Bluetooth connection—for example, music streamed from a mobile phone to wireless headphones.

Although many products may have Bluetooth enabled for voice calls, in order for music to be streamed from one Bluetooth device to another, both devices will need to have this A2DP profile. If both devices to do not contain this profile, you may still be able to connect using a standard Headset or Handsfree profile, however these profiles do not currently support stereo music.

Thus, Earpieces using the A2DP profile may have their own priority settings over communications that may prevent the transmission of communications. Embodiments herein could include detection of keywords (of sufficient criticality) to cause the stopping of music streaming and transmission on a reverse channel of the keywords back to a phone or server or cloud. Alternatively, an embodiment herein could allow the continuance of music streaming, but set up a simultaneous transmission on a separate reverse channel from the channel being used for streaming.

Existing Bluetooth headsets and their usage models lead to very sobering results in terms of battery life, power consumption, comfort, audio quality, and fit. If one were to compare existing Bluetooth headsets to how contact lenses are used, the disappointment becomes even more pronounced. With contact lenses, a user performs the following: Clean during the night, put in lenses in the morning, take out at night. If one were to analogize earpiece or "buds" to contact lenses, then while the buds are cleaning they are also charging and downloading all the captured data (audio and biometrics).

Figure 5:
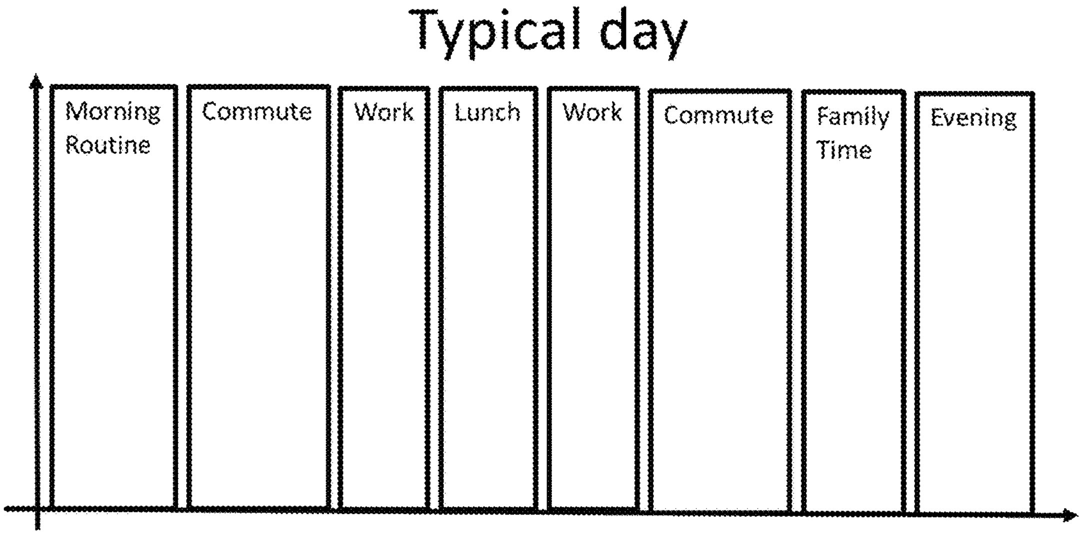
FIG. 5 is a chart illustrating events activities for a typical day in accordance with an embodiment.
Figure 6:
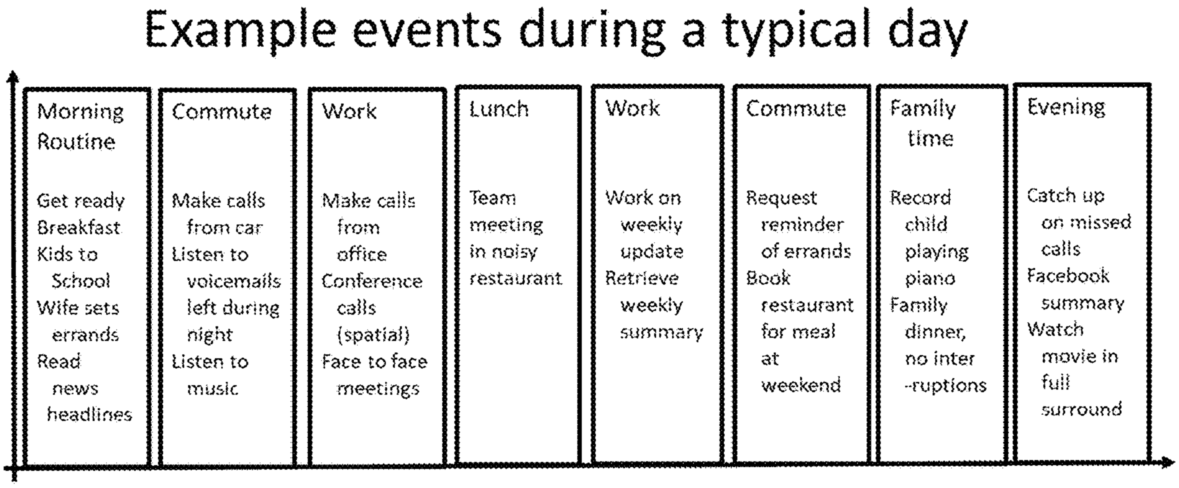
FIG. 6 is a chart illustrating example events or activities during a typical day in further detail in accordance with an embodiment.

Although the following figures are only focused on the audio part, biometric data collection should be negligible in comparison in terms of power consumption and are not included in the illustrations of FIGS. 5-7. FIG. 5 illustrates a chart 500 of a typical day for an individual that might have a morning routine, a commute, morning work hours, lunch, afternoon work hours, a return commute, family time and evening time. FIG. 6 is a chart 600 that further details the typical day with example events that occur during such a typical day. The morning routine can include preparing breakfast, reading news, etc., the commute can include making calls, listening to voicemails, or listening to music, the morning work hours could include conference calls and face to face meeting, lunch could include a team meeting in a noisy environment, work in the afternoon might include retrieving summaries, the return commute can include retrieving reminders or booking dinner, family time could include dinner without interruptions, and evening could include watching a moving. Other events are certainly contemplated and noted in the examples illustrated. FIG. 7 is a chart 700 that further illustrates examples of device usage.

As discussed above, there are a number of ways to optimize and essentially extend the battery life of a device. One or more the optimization methods can be used based on the particular use case. The optimizations methods include, but are not limited to application specific connectivity, proprietary data connections, discontinuous transfer of data, connectivity status, Binaural devices, Bluetooth optimization, and the aural iris.

With respect to binaural devices and binaural hearing, note that humans have evolved to use both ears and that the brain is extremely proficient at distinguishing between different sounds and determining which to pay attention to. A device and method can operate efficiently without necessarily disrupting the natural cues. Excessive DSP processing can cause significant problems despite being measured as "better". In some instances, less DSP processing is actually better and further provides the benefit of using less power resources. FIG. 8 illustrates a chart 800 having example device usage modes with examples for specific device modes, a corresponding description, a power usage level, and duration. The various modes include passthrough, voice capture, ambient capture, commands, data transfer, voice calls, advanced voice calls, media (music or video), and advanced media such as virtual reality or augmented reality.

Figure 9:
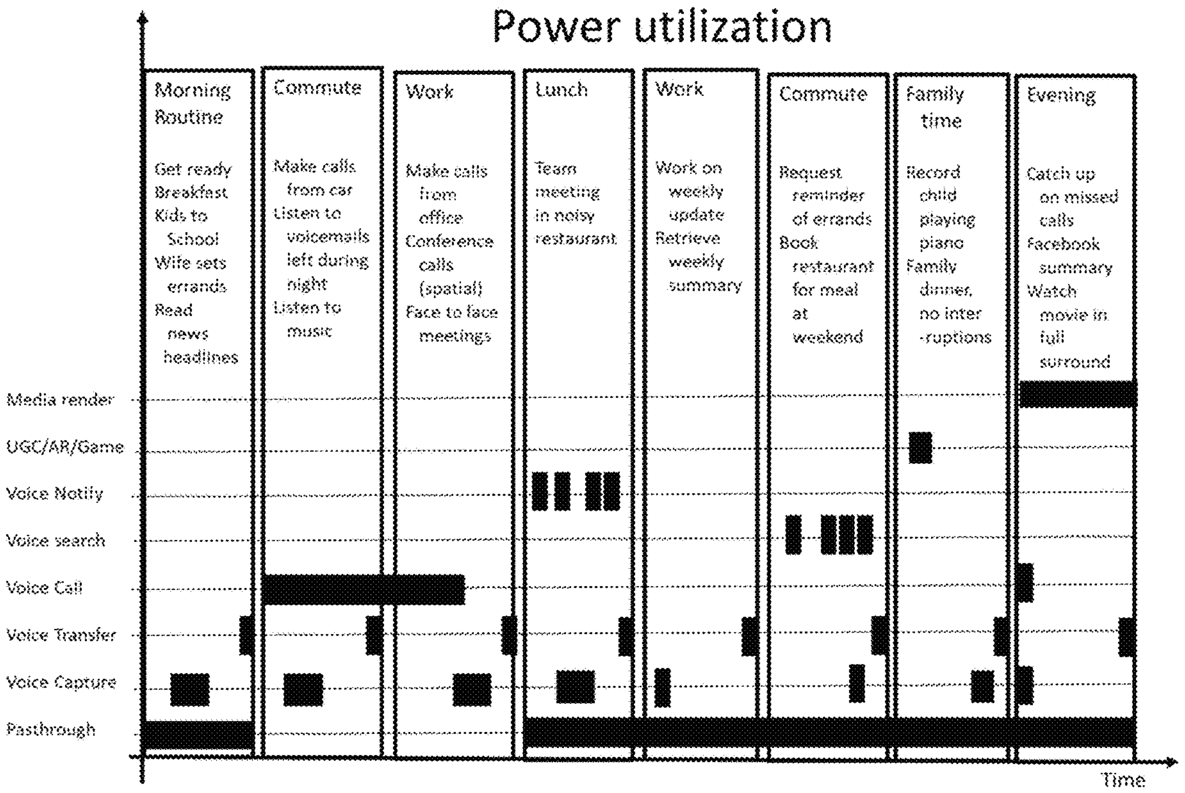
FIG. 9 is a chart illustrating in further detail example power utilization during a typical day for various modes or functions in accordance with an embodiment.

The device usage modes above and the corresponding power consumption or power utilization as illustrated in the chart 900 of FIG. 9 can be used to modify or alter the hierarchy described above and can further provide insight as to how energy resources can be deployed or managed in an earpiece or pair of earpieces. With regard to a pair of earpieces, further consideration can also be made in terms of power management regarding whether the earpieces are wirelessly connected to each other or if they have wired connections to each other (for connectivity and/or power resources). Additional consideration should be made to the proximity that the earpieces are to not only each other, but to another device such as a phone or to a node or a network in general.

Most people don't think to charge their Bluetooth device after each use. This is different in the enterprise environment where a neat docking cradle is provided. This keeps it topped up and ready for a day of usage. Regular consumer applications don't work like that.

Most smartphone users have changed their behavior to charge every night. This allows them to use for a full day for most applications.

The slides above represent a "power user" or a Business person that handles a lot of phone calls, makes recordings of their children and watches online content. The bud (or earpiece) needs to handle all of those "connected" use cases.

In addition the earpiece or bud should ensure to continue to pass through audio all day. Assumption, without the use of an aural iris, a similar function can be done in electronics, like a hearing aid.

The earpiece or bud should capture the speech the wearer is saying. This should be low power to store locally in memory.

Running very low power processing on the captured speech (such as Sensory) can help to determine if the capture speech includes a keyword, such as "Hello Google". If so, the earpiece or bud awakes the connection to the phone and transmit the sentence as a command.

Furthermore, the connection to the phone can be activated based on other metrics. For example, the ear piece may deliberately pass the captured audio to the phone for improved processing and analysis, rather than use its own internal power and DSP. The transmission of the unprocessed audio data can use less power than intensive processing.

In some embodiments, a system or device for insertion within an ear canal or other biological conduit or non-biological conduits comprises at least one sensor, a mechanism for either being anchored to a biological conduit or occluding the conduit, and a vehicle for processing and communicating any acquired sensor data. In some embodiments, the device is a wearable device for insertion within an ear canal and comprises an expandable element or balloon used for occluding the ear canal. The wearable device can include one or more sensors that can optionally include sensors on, embedded within, layered, on the exterior or inside the expandable element or balloon. Sensors can also be operationally coupled to the monitoring device either locally or via wireless communication. Some of the sensors can be housed in a mobile device or jewelry worn by the user and operationally coupled to the earpiece. In other words, a sensor mounted on phone or another device that can be worn or held by a user can serve as yet another sensor that can capture or harvest information and be used in conjunction with the sensor data captured or harvested by an earpiece monitoring device. In yet other embodiments, a vessel, a portion of human vasculature, or other human conduit (not limited to an ear canal) can be occluded and monitored with different types of sensors. For example, a nasal passage, gastric passage, vein, artery or a bronchial tube can be occluded with a balloon or stretched membrane and monitored for certain coloration, acoustic signatures, gases, temperature, blood flow, bacteria, viruses, or pathogens Gust as a few examples) using an appropriate sensor or sensors. See Provisional Patent Application No. 62/246,479 entitled "BIOMETRIC, PHYSIOLOGICAL OR ENVIRONMENTAL MONITORING USING A CLOSED CHAMBER" filed on Oct. 26, 2015, and incorporated herein by reference in its entirety.

Figure 10A:
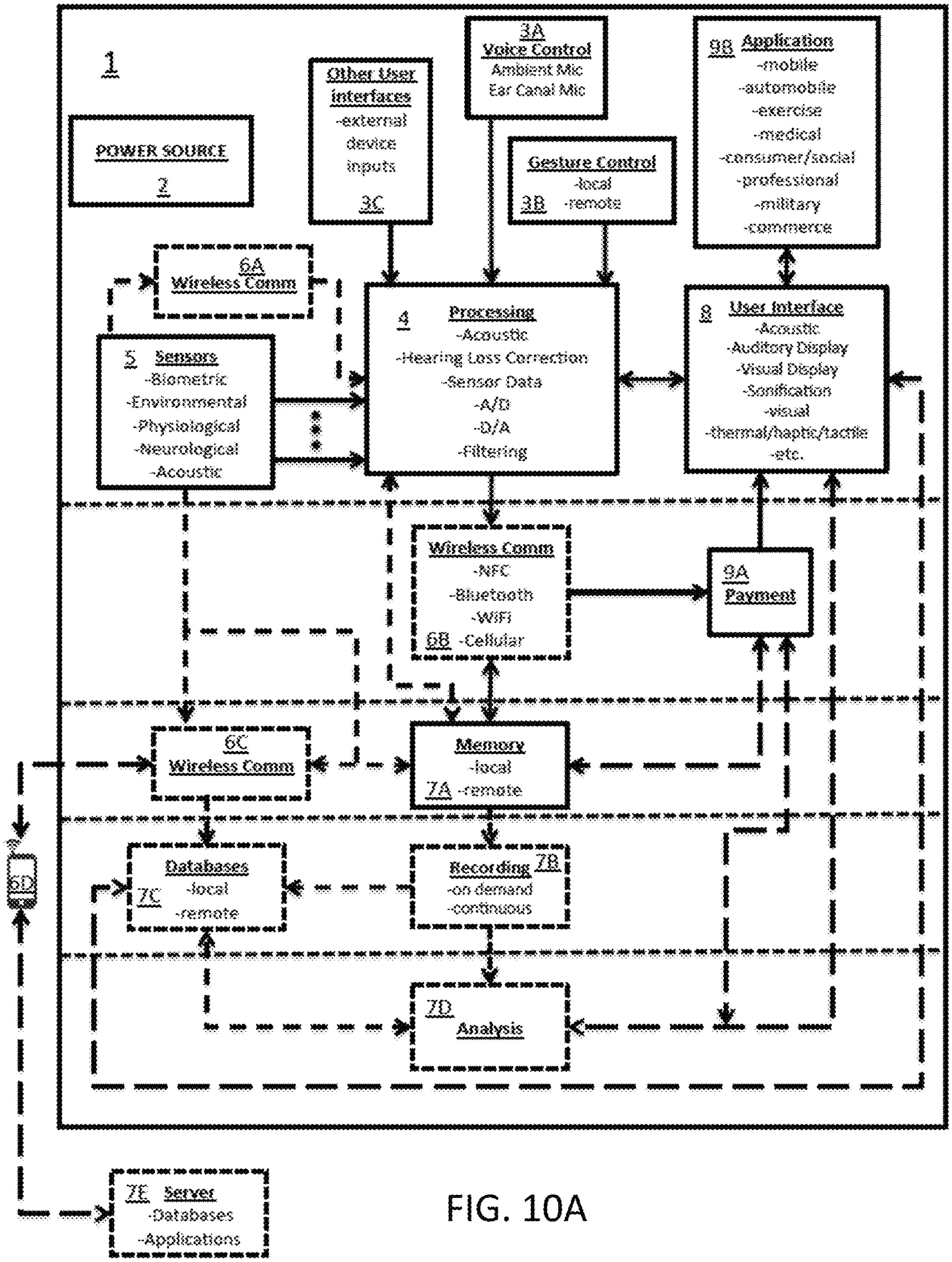
FIG. 10A a block diagram of a system or device for an miniaturized earpiece in accordance with an embodiment.

In some embodiments, a system or device 1 as illustrated in FIG. 10A, can be part of an integrated miniaturized earpiece (or other body worn or embedded device) that includes all or a portion of the components shown. In other embodiments, a first portion of the components shown comprise part of a system working with an earpiece having a remaining portion that operates cooperatively with the first portion. In some embodiments, an fully integrated system or device 1 can include an earpiece having a power source 2 (such as button cell battery, a rechargeable battery, or other power source) and one or more processors 4 that can process a number of acoustic channels, provide for hearing loss correction and prevention, process sensor data, convert signals to and from digital and analog and perform appropriate filtering. In some embodiments, the processor 4 is formed from one or more digital signal processors (DSPs). The device can include one or more sensors 5 operationally coupled to the processor 4. Data from the sensors can be sent to the processor directly or wirelessly using appropriate wireless modules 6A and communication protocols such as Bluetooth, WiFi, NFC, RF, and Optical such as infrared for example. The sensors can constitute biometric, physiological, environmental, acoustical, or neurological among other classes of sensors. In some embodiments, the sensors can be embedded or formed on or within an expandable element or balloon that is used to occlude the ear canal. Such sensors can include non-invasive contactless sensors that have electrodes for EEGs, ECGs, transdermal sensors, temperature sensors, transducers, microphones, optical sensors, motion sensors or other biometric, neurological, or physiological sensors that can monitor brainwaves, heartbeats, breathing rates, vascular signatures, pulse oximetry, blood flow, skin resistance, glucose levels, and temperature among many other parameters. The sensor(s) can also be environmental including, but not limited to, ambient microphones, temperature sensors, humidity sensors, barometric pressure sensors, radiation sensors, volatile chemical sensors, particle detection sensors, or other chemical sensors. The sensors 5 can be directly coupled to the processor 4 or wirelessly coupled via a wireless communication system 6A. Also note that many of the components shown can be wirelessly coupled to each other and not necessarily limited to the wireless connections shown.

As an earpiece, some embodiments are primarily driven by acoustical means (using an ambient microphone or an ear canal microphone for example), but the earpiece can be a multimodal device that can be controlled by not only voice using a speech or voice recognition engine 3A (which can be local or remote), but by other user inputs such as gesture control 3B, or other user interfaces 3C can be used (e.g., external device keypad, camera, etc). Similarly, the outputs can primarily be acoustic, but other outputs can be provided. The gesture control 3B, for example, can be a motion detector for detecting certain user movements (finger, head, foot, jaw, etc.) or a capacitive or touch screen sensor for detecting predetermined user patterns detected on or in close proximity to the sensor. The user interface 3C can be a camera on a phone or a pair of virtual reality (VR) or augmented reality (AR) "glasses" or other pair of glasses for detecting a wink or blink of one or both eyes. The user interface 3C can also include external input devices such as touch screens or keypads on mobile devices operatively coupled to the device 1. The gesture control can be local to the earpiece or remote (such as on a phone). As an earpiece, the output can be part of a user interface 8 that will vary greatly based on the application 9B (which will be described in further detail below). The user interface 8 can be primary acoustic providing for a text to speech output, or an auditory display, or some form of sonification that provides some form of non-speech audio to convey information or perceptualize data. Of course, other parts of the user interface 8 can be visual or tactile using a screen, LEDs and/or haptic device as examples.

In one embodiment, the User Interface 8 can use what is known as "sonification" to enable wayfinding to provide users an auditory means of direction finding. For example and analogous to a Geiger counter, the user interface 8 can provide a series of beeps or clicks or other sound that increase in frequency as a user follows a correct path towards a predetermined destination. Straying away from the path will provide beeps, clicks or other sounds that will then slow down in frequency. In one example, the wayfinding function can provide an alert and steer a user left and right with appropriate beeps or other sonification. The sounds can vary in intensity, volume, frequency, and direction to assist a user with wayfinding to a particular destination. Differences or variations using one or two ears can also be exploited. Head-related transfer function (HRTF) cues can be provided. A HRTF is a response that characterizes how an ear receives a sound from a point in space; a pair of HRTFs for two ears can be used to synthesize a binaural sound that seems to come from a particular point in space. Humans have just two ears, but can locate sounds in three dimensions in terms of range (distance), in terms of direction above and below, in front and to the rear, as well as to either side. This is possible because the brain, inner ear and the external ears (pinna) work together to make inferences about location. This ability to localize sound sources may have developed in humans and ancestors as an evolutionary necessity, since the eyes can only see a fraction of the world around a viewer, and vision is hampered in darkness, while the ability to localize a sound source works in all directions, to varying accuracy, regardless of the surrounding light. Some consumer home entertainment products designed to reproduce surround sound from stereo (two-speaker) headphones use HRTFs and similarly, such directional simulation can be used with earpieces to provide a wayfinding function.

In some embodiments, the processor 4 is coupled (either directly or wirelessly via module 6B) to memory 7A which can be local to the device 1 or remote to the device (but part of the system). The memory 7A can store acoustic information, raw or processed sensor data, or other information as desired. The memory 7A can receive the data directly from the processor 4 or via wireless communications 6B. In some embodiments, the data or acoustic information is recorded (7B) in a circular buffer or other storage device for later retrieval. In some embodiments, the acoustic information or other data is stored at a local or a remote database 7C. In some embodiments, the acoustic information or other data is analyzed by an analysis module 7D (either with or without recording 7B) and done either locally or remotely. The output of the analysis module can be stored at the database 7C or provided as an output to the user or other interested part (e.g., user's physician, a third party payment processor. Note that storage of information can vary greatly based on the particular type of information obtained. In the case of acoustic information, such information can be stored in a circular buffer, while biometric and other data may be stored in a different form of memory (either local or remote). In some embodiments, captured or harvested data can be sent to remote storage such as storage in "the cloud" when battery and other conditions are optimum (such as during sleep).

In some embodiments, the earpiece or monitoring device can be used in various commercial scenarios. One or more of the sensors used in the monitoring device can be used to create a unique or highly non-duplicative signature sufficient for authentication, verification or identification. Some human biometric signatures can be quite unique and be used by themselves or in conjunction with other techniques to corroborate certain information. For example, a heart beat or heart signature can be used for biometric verification. An individual's heart signature under certain contexts (under certain stimuli as when listening to a certain tone while standing or sitting) may have certain characteristics that are considered sufficiently unique. The heart signature can also be used in conjunction with other verification schemes such as pin numbers, predetermined gestures, fingerprints, or voice recognition to provide a more robust, verifiable and secure system. In some embodiments, biometric information can be used to readily distinguish one or more speakers from a group of known speakers such as in a teleconference call or a video conference call.

In some embodiments, the earpiece can be part of a payment system 9A that works in conjunction with the one or more sensors 5. In some embodiments, the payment system 9A can operate cooperatively with a wireless communication system 6B such as a 1-3 meter Near Field Communication (NFC) system, Bluetooth wireless system, WiFi system, or cellular system. In one embodiment, a very short range wireless system uses an NFC signal to confirm possession of the device in conjunction with other sensor information that can provide corroboration of identification, authorization, or authentication of the user for a transaction. In some embodiments, the system will not fully operate using an NFC system due to distance limitations and therefore another wireless communication protocol can be used.

In one embodiment, the sensor 5 can include a Snapdragon Sense ID 3D fingerprint technology by Qualcomm or other designed to boost personal security, usability and integration over touch-based fingerprint technologies. The new authentication platform can utilize Qualcomm's SecureMSM technology and the FIDO (Fast Identity Online) Alliance Universal Authentication Framework (UAF) specification to remove the need for passwords or to remember multiple account usernames and passwords. As a result, in the future, users will be able to login to any website which supports FIDO through using their device and a partnering browser plug-in which can be stored in memory 7A or elsewhere. solution) The Qualcomm fingerprint scanner technology is able to penetrate different levels of skin, detecting 3D details including ridges and sweat pores, which is an element touch-based biometrics do not possess. Of course, in a multimodal embodiment, other sensor data can be used to corroborate identification, authorization or authentication and gesture control can further be used to provide a level of identification, authorization or authentication. Of course, in many instances, 3D fingerprint technology may be burdensome and considered "over-engineering" where a simple acoustic or biometric point of entry is adequate and more than sufficient. For example, after an initial login, subsequent logins can merely use voice recognition as a means of accessing a device. If further security and verification is desired for a commercial transaction for example, then other sensors as the 3D fingerprint technology can be used.

In some embodiments, an external portion of the earpiece (e.g., an end cap) can include a fingerprint sensor and/or gesture control sensor to detect a fingerprint and/or gesture. Other sensors and analysis can correlate other parameters to confirm that user fits a predetermined or historical profile within a predetermined threshold. For example, a resting heart rate can typically be within a given range for a given amount of detected motion. In another example, a predetermined brainwave pattern in reaction to a predetermined stimulus (e.g., music, sound pattern, visual presentation, tactile stimulation, etc.) can also be found be within a given range for a particular person. In yet another example, sound pressure levels (SPL) of a user's voice and/or of an ambient sound can be measured in particular contexts (e.g, in a particular store or at a particular venue as determined by GPS or a beacon signal) to verify and corroborate additional information alleged by the user. For example, a person conducting a transaction at a known venue having a particular background noise characteristic (e.g., periodic tones or announcements or Muzak playing in the background at known SPL levels measured from a point of sale) commonly frequented by the user of the monitoring device can provide added confirmation that a particular transaction is occurring in a location by the user. In another context, if a registered user at home (with minimal background noise) is conducting a transaction and speaking with a customer service representative regarding the transaction, the user may typically speak at a particular volume or SPL indicative that the registered user is the actual person claiming to make the transaction. A multimodal profile can be built and stored for an individual to sufficiently corroborate or correlate the information to that individual. Presumably, the correlation and accuracy becomes stronger over time as more sensor data is obtained as the user utilizes the device 1 and a historical profile is essentially built. Thus, a very robust payment system 9A can be implemented that can allow for mobile commerce with the use of the earpiece alone or in conjunction with a mobile device such as a cellular phone. Of course, information can be stored or retained remotely in server or database and work cooperatively with the device 1. In other applications, the pay system can operate with almost any type of commerce.

Figure 10B:
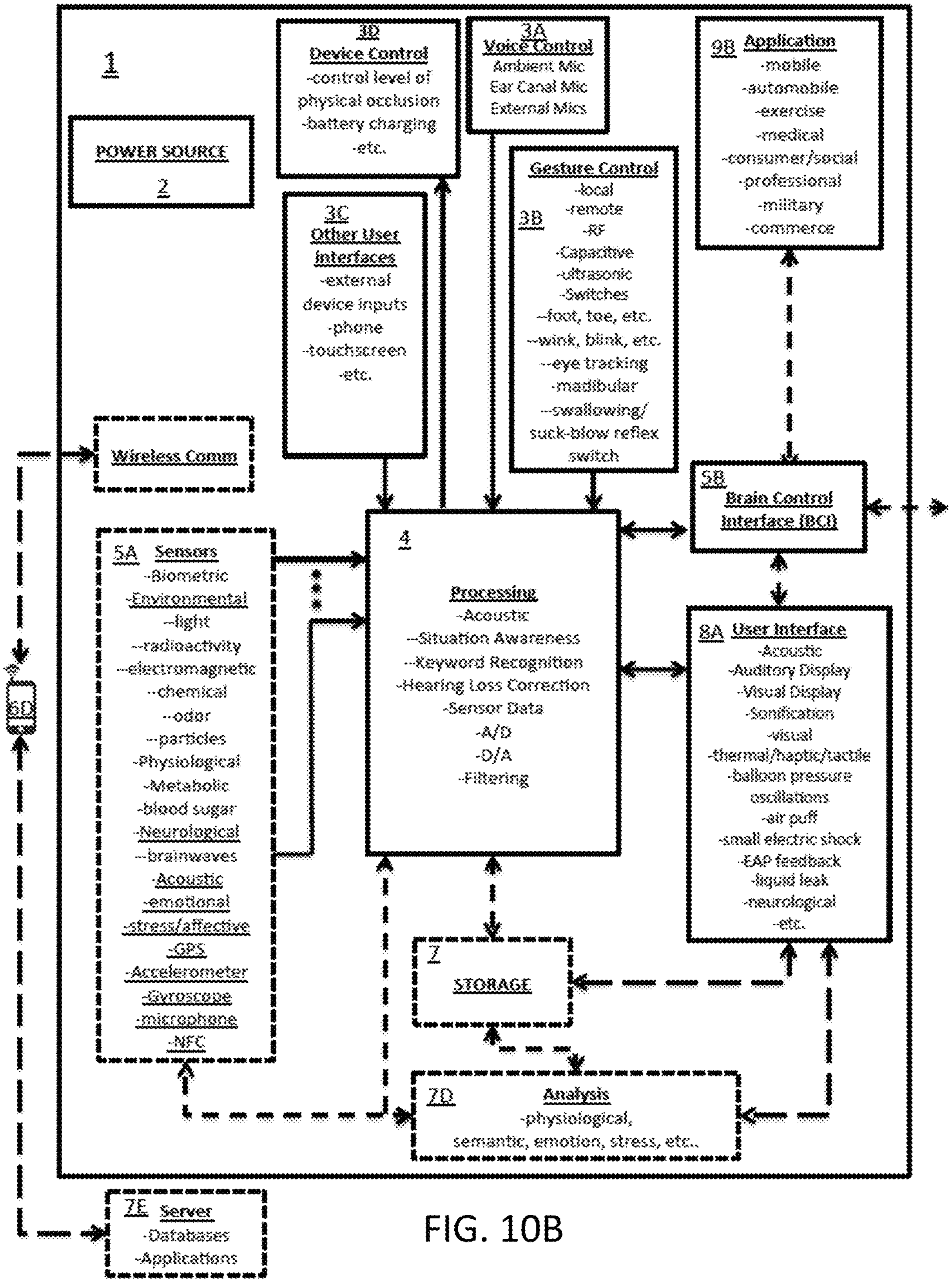
FIG. 10B is a block diagram of another system or device similar to the device or system of FIG. 10A in accordance with an embodiment.
Figure 11A:
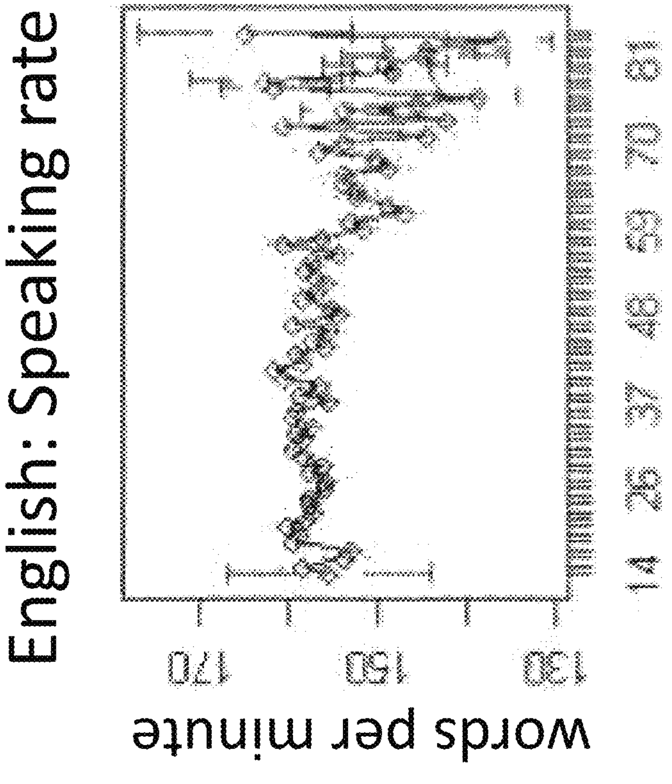
FIGS. 11A and 11B show the effects of speaker age.
Figure 11B:
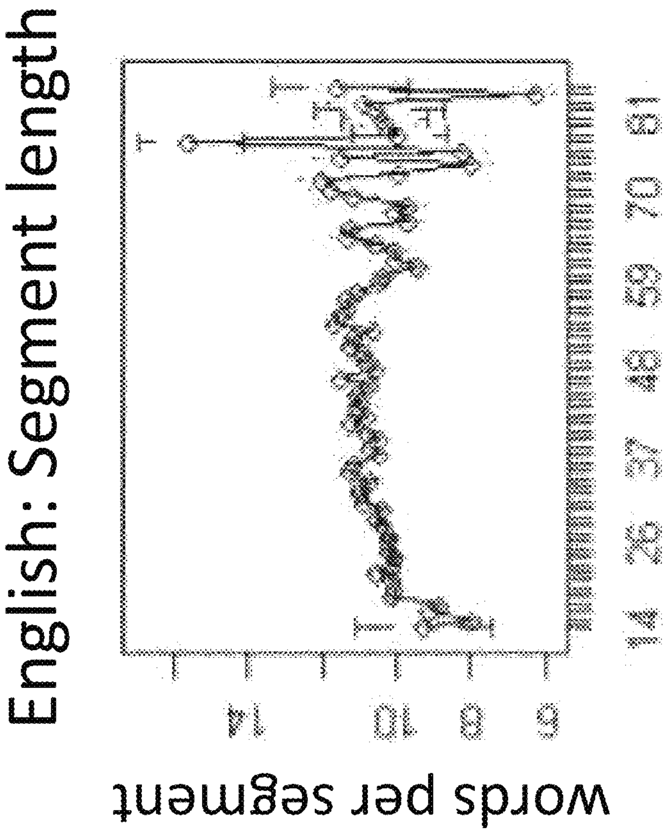

Referring to FIG. 10B, a device 1, substantially similar to the device 1 of FIG. 1A is shown with further details in some respects and less details in other respects. For simplicity, local or remote memory, local or remote databases, and features for recording can all be represented by the storage device 7 which can be coupled to an analysis module 7D. As before, the device can be powered by a power source 2. The device 1 can include one or more processors 4 that can process a number of acoustic channels and process such channels for situational awareness and/or for keyword or sound pattern recognition, as well as daily speech the user speaks, coughs, sneezes, etc. The processor(s) 4 can provide for hearing loss correction and prevention, process sensor data, convert signals to and from digital and analog and perform appropriate filtering as needed. In some embodiments, the processor 4 is formed from one or more digital signal processors (DSPs). The device can include one or more sensors 5 operationally coupled to the processor 4. The sensors can be biometric and/or environmental. Such environmental sensors can sense one or more among light, radioactivity, electromagnetism, chemicals, odors, or particles. The sensors can also detect physiological changes or metabolic changes. In some embodiments, the sensors can include electrodes or contactless sensors and provide for neurological readings including brainwaves. The sensors can also include transducers or microphones for sensing acoustic information. Other sensors can detect motion and can include one or more of a GPS device, an accelerometer, a gyroscope, a beacon sensor, or NFC device. One or more sensors can be used to sense emotional aspects such as stress or other affective attributes. In a multimodal, multisensory embodiment, a combination of sensors can be used to make emotional or mental state assessments or other anticipatory determinations.

User interfaces can be used alone or in combination with the aforementioned sensors to also more accurately make emotional or mental state assessments or other anticipatory determinations. A voice control module 3A can include one or more of an ambient microphone, an ear canal microphone or other external microphones (e.g., from a phone, lap top, or other external source) to control the functionality of the device 1 to provide a myriad of control functions such as retrieving search results (e.g., for information, directions) or to conduct transactions (e.g., ordering, confirming an order, making a purchase, canceling a purchase, etc.), or to activate other functions either locally or remotely (e.g., turn on a light, open a garage door). The use of an expandable element or balloon for sealing an ear canal can be strategically used in conjunction with an ear canal microphone (in the sealed ear canal volume) to isolate a user's voice attributable to bone conduction and correlate such voice from bone conduction with the user's voice picked up by an ambient microphone. Through appropriate mixing of the signal from the ear canal microphone and the ambient microphone, such mixing technique can provide for a more intelligible voice substantially free of ambient noise that is more recognizable by voice recognition engines such as SIRI by Apple, Google Now by Google, or Cortana by Microsoft.

The voice control interface 3A can be used alone or optionally with other interfaces that provide for gesture control 3B. Alternatively, the gesture control interface(s) 3B can be used by themselves. The gesture control interface(s) 3B can be local or remote and can be embodied in many different forms or technologies. For example, a gesture control interface can use radio frequency, acoustic, optical, capacitive, or ultrasonic sensing. The gesture control interface can also be switch-based using a foot switch or toe switch. An optical or camera sensor or other sensor can also allow for control based on winks, blinks, eye movement tracking, mandibular movement, swallowing, or a suck-blow reflex as examples.

The processor 4 can also interface with various devices or control mechanisms within the ecosystem of the device 1.

For example, the device can include various valves that control the flow of fluids or acoustic sound waves. More specifically, in one example the device 1 can include a shutter or "aural iris" in the form of an electro active polymer that controls a level or an opening size that controls the amount of acoustic sound that passes through to the user's ear canal. In another example, the processor 4 can control a level of battery charging to optimize charging time or optimize battery life in consideration of other factors such as temperature or safety in view of the rechargeable battery technology used.

A brain control interface (BCI) 5B can be incorporated in the embodiments to allow for control of local or remote functions including, but not limited to prosthetic devices. In some embodiments, electrodes or contactless sensors in the balloon of an earpiece can pickup brainwaves or perform an EEG reading that can be used to control the functionality of the earpiece itself or the functionality of external devices. The BCI 5B can operate cooperatively with other user interfaces (8A or 3C) to provide a user with adequate control and feedback. In some embodiments, the earpiece and electrodes or contactless sensors can be used in Evoked Potential Tests. Evoked potential tests measure the brain's response to stimuli that are delivered through sight, hearing, or touch. These sensory stimuli evoke minute electrical potentials that travel along nerves to the brain, and can be recorded typically with patch-like sensors (electrodes) that are attached to the scalp and skin over various peripheral sensory nerves, but in these embodiments, the contactless sensors in the earpiece can be used instead. The signals obtained by the contactless sensors are transmitted to a computer, where they are typically amplified, averaged, and displayed. There are 3 major types of evoked potential tests including: 1) Visual evoked potentials, which are produced by exposing the eye to a reversible checkerboard pattern or strobe light flash, help to detect vision impairment caused by optic nerve damage, particularly from multiple sclerosis; 2) Brainstem auditory evoked potentials, generated by delivering clicks to the ear, which are used to identify the source of hearing loss and help to differentiate between damage to the acoustic nerve and damage to auditory pathways within the brainstem; and 3) Somatosensory evoked potentials, produced by electrically stimulating a peripheral sensory nerve or a nerve responsible for sensation in an area of the body which can be used to diagnose peripheral nerve damage and locate brain and spinal cord lesions The purpose of the Evoked Potential Tests include assessing the function of the nervous system, aiding in the diagnosis of nervous system lesions and abnormalities, monitoring the progression or treatment of degenerative nerve diseases such as multiple sclerosis, monitoring brain activity and nerve signals during brain or spine surgery, or in patients who are under general anesthesia, and assessing brain function in a patient who is in a coma. In some embodiments, particular brainwave measurements (whether resulting from Evoked Potential stimuli or not) can be correlated to particular thoughts and selections to train a user to eventually consciously make selections merely by using brainwaves. For example, if a user is given a selection among A Apple B. Banana and C. Cherry, a correlation of brainwave patterns and a particular selection can be developed or profiled and then subsequently used in the future to determine and match when a particular user merely thinks of a particular selection such as "C. Cherry". The more distinctively a particular pattern correlates to a particular selection, the more reliable the use of this technique as a user input.

User interface 8A can include one or more among an acoustic output or an "auditory display", a visual display, a sonification output, or a tactile output (thermal, haptic, liquid leak, electric shock, air puff, etc.). In some embodiments, the user interface 8A can use an electroactive polymer (EAP) to provide feedback to a user. As noted above, a BCI 5B can provide information to a user interface 8A in a number of forms. In some embodiments, balloon pressure oscillations or other adjustments can also be used as a means of providing feedback to a user. Also note that mandibular movements (chewing, swallowing, yawning, etc.) can alter balloon pressure levels (of a balloon in an ear canal) and be used as way to control functions. (Also note that balloon pressure can be monitored to correlate with mandibular movements and thus be used as a sensor for monitoring such actions as chewing swallowing and yawning).

Other user interfaces 3C can provide external device inputs that can be processed by the processor(s) 4. As noted above, these inputs include, but are not limited to, external device keypads, keyboards, cameras, touch screens, mice, and microphones to name a few.

The user interfaces, types of control, and/or sensors may likely depend on the type of application 9B. In a mobile application, a mobile phone microphone(s), keypad, touchscreen, camera, or GPS or motion sensor can be utilized to provide a number of the contemplated functions. In a vehicular environment, a number of the functions can be coordinated with a car dash and stereo system and data available from a vehicle. In an exercise, medical, or health context, a number of sensors can monitor one or more among, heart beat, blood flow, blood oxygenation, pulse oximetry, temperature, glucose, sweat, electrolytes, lactate, pH, brainwave, EEG, ECG or other physiological, or biometric data. Biometric data can also be used to confirm a patient's identity in a hospital or other medical facility to reduce or avoid medical record errors and mix-ups. In a social networking environment, users in a social network can detect each other's presence, interests, and vital statistics to spur on athletic competition, commerce or other social goals or motivations. In a military or professional context, various sensors and controls disclosed herein can offer a discrete and nearly invisible or imperceptible way of monitoring and communicating that can extend the "eyes and ears" of an organization to each individual using an earpiece as described above. In a commercial context, a short-range communication technology such as NFC or beacons can be used with other biometric or gesture information to provide for a more robust and secure commercial transactional system. In a call center context or other professional context, the earpiece could incorporate a biosensor that measures emotional excitement by measuring physiological responses. The physiological responses can include skin conductance or Galvanic Skin Response, temperature and motion.

In yet other aspects, some embodiments can monitor a person's sleep quality, mood, or assess and provide a more robust anticipatory device using a semantics acoustic engine with other sensors. The semantic engine can be part of the processor 4 or part of the analysis module 7D that can be performed locally at the device 1 or remotely as part of an overall system. If done remotely at a remote server, the system 1 can include a server (or cloud) that includes algorithms for analysis of gathered sensor data and profile information for a particular user. In contrast to other schemes, the embodiments herein can perform semantic analysis based on all biometrics, audio, and metadata (speaker ID, etc.) in combination and also in a much "cleaner" environments within a sealed EAC sealed by a proprietary balloon that is immune to many of the detriments in other schemes used to attempt to seal an EAC. Depending on the resources available at a particular time such as processing power, semantic analysis applications, or battery life, the semantic analysis would be best performed locally within a monitoring earpiece device itself, or within a cellular phone operationally coupled to the earpiece, or within a remote server or cloud or a combination thereof Though the methods herein may apply broadly to a variety of form factors for a monitoring apparatus, in some embodiments herein a 2-way communication device in the form of an earpiece with at least a portion being housed in an ear canal can function as a physiological monitor, an environmental monitor, and a wireless personal communicator. Because the ear region is located next to a variety of "hot spots" for physiological an environmental sensing—including the carotid artery, the paranasal sinus, etc.—in some cases an earpiece monitor takes preference over other form factors. Furthermore, the earpiece can use the ear canal microphone to obtain heart rate, heart rate signature, blood pressure and other biometric information such as acoustic signatures from chewing or swallowing or from breathing or breathing patterns. The earpiece can take advantage of commercially available open-architecture, ad hoc, wireless paradigms, such as Bluetooth®, Wi-Fi, or ZigBee. In some embodiments, a small, compact earpiece contains at least one microphone and one speaker, and is configured to transmit information wirelessly to a recording device such as, for example, a cell phone, a personal digital assistant (PDA), and/or a computer. In another embodiment, the earpiece contains a plurality of sensors for monitoring personal health and environmental exposure. Health and environmental information, sensed by the sensors is transmitted wirelessly, in real-time, to a recording device or media, capable of processing and organizing the data into meaningful displays, such as charts. In some embodiments, an earpiece user can monitor health and environmental exposure data in real-time, and may also access records of collected data throughout the day, week, month, etc., by observing charts and data through an audio-visual display. Note that the embodiments are not limited to an earpiece and can include other body worn or insertable or implantable devices as well as devices that can be used outside of a biological context (e.g., an oil pipeline, gas pipeline, conduits used in vehicles, or water or other chemical plumbing or conduits). Other body worn devices contemplated herein can incorporate such sensors and include, but are not limited to, glasses, jewelry, watches, anklets, bracelets, contact lenses, headphones, earphones, earbuds, canal phones, hats, caps, shoes, mouthpieces, or nose plugs to name a few. In addition, all types of body insertable devices are contemplated as well.

Further note that the shape of the balloon will vary based on the application. Some of the various embodiments herein stem from characteristics of the unique balloon geometry "UBG" sometimes referred to as stretched or flexible membranes, established from anthropomorphic studies of various biological lumens such as the external auditory canal (EAC) and further based on the "to be worn location" within the ear canal. Other embodiments herein additionally stem from the materials used in the construction of the UBG balloon, the techniques of manufacturing the UBG and the materials used for the filling of the UBG. Some embodiments exhibit an overall shape of the UBG as a prolate spheroid in geometry, easily identified by its polar axis being greater than the equatorial diameter. In other embodiments, the shape can be considered an oval or ellipsoid. Of course, other biological lumens and conduits will ideally use other shapes to perform the various functions described herein. See patent application Ser. No. 14/964,041 entitled "MEMBRANE AND BALLOON SYSTEMS AND DESIGNS FOR CONDUITS" filed on Dec. 9, 2015, and incorporated herein by reference in its entirety.

Each physiological sensor can be configured to detect and/or measure one or more of the following types of physiological information: heart rate, pulse rate, breathing rate, blood flow, heartbeat signatures, cardio-pulmonary health, organ health, metabolism, electrolyte type and/or concentration, physical activity, caloric intake, caloric metabolism, blood metabolite levels or ratios, blood pH level, physical and/or psychological stress levels and/or stress level indicators, drug dosage and/or dosimetry, physiological drug reactions, drug chemistry, biochemistry, position and/or balance, body strain, neurological functioning, brain activity, brain waves, blood pressure, cranial pressure, hydration level, auscultatory information, auscultatory signals associated with pregnancy, physiological response to infection, skin and/or core body temperature, eye muscle movement, blood volume, inhaled and/or exhaled breath volume, physical exertion, exhaled breath, snoring, physical and/or chemical composition, the presence and/or identity and/or concentration of viruses and/or bacteria, foreign matter in the body, internal toxins, heavy metals in the body, blood alcohol levels, anxiety, fertility, ovulation, sex hormones, psychological mood, sleep patterns, hunger and/or thirst, hormone type and/or concentration, cholesterol, lipids, blood panel, bone density, organ and/or body weight, reflex response, sexual arousal, mental and/or physical alertness, sleepiness, auscultatory information, response to external stimuli, swallowing volume, swallowing rate, mandibular movement, mandibular pressure, chewing, sickness, voice characteristics, voice tone, voice pitch, voice volume, vital signs, head tilt, allergic reactions, inflammation response, auto-immune response, mutagenic response, DNA, proteins, protein levels in the blood, water content of the blood, blood cell count, blood cell density, pheromones, internal body sounds, digestive system functioning, cellular regeneration response, healing response, stem cell regeneration response, and/or other physiological information.

Each environmental sensor is configured to detect and/or measure one or more of the following types of environmental information: climate, humidity, temperature, pressure, barometric pressure, soot density, airborne particle density, airborne particle size, airborne particle shape, airborne particle identity, volatile organic chemicals (VOCs), hydrocarbons, polycyclic aromatic hydrocarbons (PAHs), carcinogens, toxins, electromagnetic energy, optical radiation, cosmic rays, X-rays, gamma rays, microwave radiation, terahertz radiation, ultraviolet radiation, infrared radiation, radio waves, atomic energy alpha particles, atomic energy beta-particles, gravity, light intensity, light frequency, light flicker, light phase, ozone, carbon monoxide, carbon dioxide, nitrous oxide, sulfides, airborne pollution, foreign material in the air, viruses, bacteria, signatures from chemical weapons, wind, air turbulence, sound and/or acoustical energy, ultrasonic energy, noise pollution, human voices, human brainwaves, animal sounds, diseases expelled from others, exhaled breath and/or breath constituents of others, toxins from others, pheromones from others, industrial and/or transportation sounds, allergens, animal hair, pollen, exhaust from engines, vapors and/or fumes, fuel, signatures for mineral deposits and/or oil deposits, snow, rain, thermal energy, hot surfaces, hot gases, solar energy, hail, ice, vibrations, traffic, the number of people in a vicinity of the person, coughing and/or sneezing sounds from people in the vicinity of the person, loudness and/or pitch from those speaking in the vicinity of the person, and/or other environmental information, as well as location in, speaker identity of current speaker, how many individual speakers in a group, the identity of all the speakers in the group, semantic analysis of the wearer as well as the other speakers, and speaker ID. Essentially, the sensors herein can be designed to detect a signature or levels or values (whether of sound, chemical, light, particle, electrical, motion, or otherwise) as can be imagined.

In some embodiments, the physiological and/or environmental sensors can be used as part of an identification, authentication, and/or payment system or method. The data gathered from the sensors can be used to identify an individual among an existing group of known or registered individuals. In some embodiments, the data can be used to authenticate an individual for additional functions such as granting additional access to information or enabling transactions or payments from an existing account associated with the individual or authorized for use by the individual.

In some embodiments, the signal processor is configured to process signals produced by the physiological and environmental sensors into signals that can be heard and/or viewed or otherwise sensed and understood by the person wearing the apparatus. In some embodiments, the signal processor is configured to selectively extract environmental effects from signals produced by a physiological sensor and/or selectively extract physiological effects from signals produced by an environmental sensor. In some embodiments, the physiological and environmental sensors produce signals that can be sensed by the person wearing the apparatus by providing a sensory touch signal (e.g., Braille, electric shock, or other).

A monitoring system, according to some embodiments of the present invention, may be configured to detect damage or potential damage levels (or metric outside a normal or expected reading) to a portion of the body of the person wearing the apparatus, and may be configured to alert the person when such damage or deviation from a norm is detected. For example, when a person is exposed to sound above a certain level that may be potentially damaging, the person is notified by the apparatus to move away from the noise source. As another example, the person may be alerted upon damage to the tympanic membrane due to loud external noises or other NIHL toxins. As yet another example, an erratic heart rate or a cardiac signature indicative of a potential issue (e.g., heart murmur) can also provide a user an alert. A heart murmur or other potential issue may not surface unless the user is placed under stress. As the monitoring unit is "ear-borne", opportunities to exercise and experience stress is rather broad and flexible. When cardiac signature is monitored using the embodiments herein, the signatures of potential issues (such as heart murmur) when placed under certain stress level can become apparent sufficient to indicate further probing by a health care practitioner.

Information from the health and environmental monitoring system may be used to support a clinical trial and/or study, marketing study, dieting plan, health study, wellness plan and/or study, sickness and/or disease study, environmental exposure study, weather study, traffic study, behavioral and/or psychosocial study, genetic study, a health and/or wellness advisory, and an environmental advisory. The monitoring system may be used to support interpersonal relationships between individuals or groups of individuals. The monitoring system may be used to support targeted advertisements, links, searches or the like through traditional media, the internet, or other communication networks. The monitoring system may be integrated into a form of entertainment, such as health and wellness competitions, sports, or games based on health and/or environmental information associated with a user.

According to some embodiments of the present invention, a method of monitoring the health of one or more subjects includes receiving physiological and/or environmental information from each subject via respective portable monitoring devices associated with each subject, and analyzing the received information to identify and/or predict one or more health and/or environmental issues associated with the subjects. Each monitoring device has at least one physiological sensor and/or environmental sensor. Each physiological sensor is configured to detect and/or measure one or more physiological factors from the subject in situ and each environmental sensor is configured to detect and/or measure environmental conditions in a vicinity of the subject. The inflatable element or balloon can provide some or substantial isolation between ambient environmental conditions and conditions used to measure physiological information in a biological organism.

The physiological information and/or environmental information may be analyzed locally via the monitoring device or may be transmitted to a location geographically remote from the subject for analysis. Pre analysis can occur on the device or smartphone connected to the device either wired or wirelessly. The collected information may undergo virtually any type of analysis. In some embodiments, the received information may be analyzed to identify and/or predict the aging rate of the subjects, to identify and/or predict environmental changes in the vicinity of the subjects, and to identify and/or predict psychological and/or physiological stress for the subjects.

Finally, further consideration can be made whether existing batteries for use in daily recordings using a Bluetooth Low Energy (BLE) transport is even feasible. The following model points to such feasibility and since the embodiments herein are not limited to Bluetooth, additional refinements in communication protocols can certainly provide improvements directed towards greater efficiency.

A model for battery use in daily recordings using BLE transport shows that such an embodiment is feasible. A model for the transport of compressed speech from daily recordings depends on the amount of speech recorded, the data rate of the compression, and the power use of the Bluetooth Low Energy channel.

A model should consider the amount of speech in the wild spoken daily. For conversations, we use as a proxy the telephone conversations from the Fisher English telephone corpus analyzed by the Linguistic Data Consortium (LDC). They counted words per turn, as well as speaking rates in these telephone conversations. While these data do not cover all the possible conversational scenarios, they are generally indicative of what human-to-human conversation looks like. See Towards an Integrated Understanding of Speaking Rate in Conversation by Jiahong Yuan et al, Dept. of Linguistics, Linguistic Data Consortium, University of Pennsylvania, pages 1-4. The LDC findings are summarized in two charts, found below. The experimenters were interested in the age of the participants, but the charts offer a reasonably consistent view of both speaking rate and segment length for conversations independent of age; speaking rate tends to be about 160 words per minute, and conversation turns tend to be about 10 words per utterance. The lengths and rates for Chinese were similar.

In another study reported in Science, in a study by Brevia, in an article entitled Are Women Really More Talkative Than Men by Matthias R. Mehl et al., Science Magazine, Vol. 317, 6 Jul. 2007, p. 82, we see that men and women tend to speak about 16,000 words per day. University students were the population studied, and speech was sampled for 30 second out of each 12.5 minutes, and all speech was transcribed. Overall daily rates were extrapolated from the sampled segments. The chart from the publication is reproduced below:

an interrupt capability will assure that no data is missed. Should the utterances be needed in closer to real time, the standard chunking protocol used in tcp/ip systems may be used. (see "TCP/IP: The Ultimate Protocol Guide", Volume 2, Philip Miller, Brown Walker Press (Mar. 15, 2009)). In this protocol, data is collected until a fixed size is reached (typically 1000 bytes or so), and the data is compressed and transmitted while data collection continues. Thus, each utterance is available almost immediately upon its completion. This real time access requires a slightly more sophisticated encoder, but has no bandwidth and small energy penalty with respect to the Bluetooth transport.

| | | | | Age range- | Sample size {N) | | Estimated average number {SD) of words spoken per day | |
|---|---|---|---|---|---|---|---|---|
| Sample | Year | Location | Duration | (years) | Women | Men | Women | Men |
| 1 | 2004 | USA | 7 days | 18-29 | 56 | 56 | 18,443 {746!}) | 16,576 (7871) |
| 2 | 2003 | USA | 4 day-s | 17--23 | 42 | 37 | 14,297 (6441) | 14,060 {9065) |
| 3 | 2003 | Mexico | 4 days | 17-25 | 31 | 20 | 14,704 {6215) | 15,022 {7864) |
| 4 | 2001 | USA | 2 days | 17-22 | 47 | 49 | 16,177 (7520) | 16,569 {9108) |
| 5 | 2001 | USA | 10 days | 18-26 | 7 | 4 | 15,761 {8985) | 24,051 {10,211} |
| 6 | 1998 | USA | 4 days | 17-23 | 27 | 20 | 16,496 (7914) | 12,867 (8343} |
| | | | | | Weighted average | | 16,215 (7301) | 15,669 {8633} |

So, finding about 16,000 words per day, and about 160 words per minute, then the talk time is about 100 minutes per day, or just short of 2 hours in all. If the average utterance length is 10 words, then people say about 1600 utterances in a day, each about 2 seconds long.

Speech is compressed in many everyday communications devices. In particular, the AMR codec found in all GSM phones (almost every cell phone) uses the ETSI GSM Enhanced Full Rate codec for high quality speech, at a data rate of 12.2 Kbits/second. Experiments with speech recognition on data from this codec suggests that very little degradation is caused by the compression (Michael Philips, CEO Vlingo, personal communications.)

With respect to power consumption, assuming a reasonable compression for speech of 12.2 Kbits/second, the 100 minutes (or 6,000 seconds) of speech will result in 73 Mbits of data per day. For a low energy Bluetooth connection, the payload data rate is limited to about 250 kBits/second. Thus the 73 Mbits of speech time can be transferred in about 300 seconds of transmit time, or somewhat less than 5 minutes.

In short, the speech data from a day's conversation for a typical user will take about 5 minutes of transfer time for the low energy Bluetooth system. We estimate (note from Johan Van Ginderdeuren of NXP) that this data transfer will use about 0.6 mAh per day, or about 2% of the charge in a 25 mAh battery, typical for a small hearing aid battery. For daily recharge, this is minimal, and for a weekly recharge, it amounts to 14% of the energy stored in the battery.

Regarding transfer protocols, a good speech detector will have high accuracy for the in-the-ear microphone, as the signal will be sampled in a low-noise environment. There are several protocols which make sense in this environment. The simplest is to transfer the speech utterances in a streaming fashion, optimizing the packet size in the Bluetooth transfer for minimal overhead. In this protocol, each utterance will be sent when the speech detector declares that an utterance is finished. Since the transmission will take only about 1/20th of the real time of the utterance, most utterances will be completely transmitted before the next utterance is started. If necessary, buffering of a few utterances along with In short, the collection of personal conversation in a stand-alone BLE device is feasible with only minor battery impact, and the transport may be designed either for highest efficiency or for real time performance.

Definitions

TRANSDUCER: A device which converts one form of energy into another. For example, a diaphragm in a telephone receiver and the carbon microphone in the transmitter are transducers. They change variations in sound pressure (one's own voice) to variations in electricity and vice versa. Another transducer is the interface between a computer, which produces electron-based signals, and a fiber-optic transmission medium, which handles photon-based signals.

An electrical transducer is a device which is capable of converting the physical quantity into a proportional electrical quantity such as voltage or electric current. Hence it converts any quantity to be measured into usable electrical signal. This physical quantity which is to be measured can be pressure, level, temperature, displacement etc. The output which is obtained from a transducer is in the electrical form and is equivalent to the measured quantity. For example, a temperature transducer will convert temperature to an equivalent electrical potential. This output signal can be used to control the physical quantity or display it.

Types of Transducers. There are of many different types of transducer, they can be classified based on various criteria as:

Types of Transducer based on Quantity to be Measured

- Temperature transducers (e.g. a thermocouple) • Pressure transducers (e.g. a diaphragm) • Displacement transducers (e.g., LVDT) • Flow transducers Types of Transducer based on the Principle of Operation

- Photovoltaic (e.g. a solar cell) • Piezoelectric • Chemical • Mutual Induction
- Electromagnetic • Hall effect • Photoconductors Types of Transducer based on Whether an External Power Source is required or not:

Active Transducer

Active transducers are those which do not require any power source for their operation. They work on the energy conversion principle. They produce an electrical signal proportional to the input (physical quantity). For example, a thermocouple is an active transducer.

Passive Transducers

Transducers which require an external power source for their operation is called as a passive transducer. They produce an output signal in the form of some variation in resistance, capacitance or any other electrical parameter, which than has to be converted to an equivalent current or voltage signal. For example, a photocell (LDR) is a passive transducer which will vary the resistance of the cell when light falls on it. This change in resistance is converted to proportional signal with the help of a bridge circuit. Hence a photocell can be used to measure the intensity of light.

Transducers can include input transducers or transducers that receive information or data and output transducers that transmit or emit information or data. Transducers can include devices that send or receive information based on acoustics, laser or light, mechanical, hepatic, photonic (LED), temperature, neurological, etc. The means by which the transducers send or receive information (particularly as relating to biometric or physiological information) can include via bone, air, and soft tissue conduction or neurological, DEVICE or COMMUNICATION DEVICE: can include, but is not limited to, a single or a pair of headphones, earphones, earpieces, earbuds, or headsets and can further include eye wear or "glass", helmets, and fixed devices, etc. In some embodiments, a device or communication device includes any device that uses a transducer for audio that occludes the ear or partially occludes the ear or does not occlude the ear at all and that uses transducers for picking up or transmitting signals photonically, mechanically, neurologically, or acoustically and via pathways such as air, bone, or soft tissue conduction.

In some embodiments, a device or communication device is a node in a network than can include a sensor. In some embodiments, a communication device can include a phone, a laptop, a FDA, a notebook computer, a fixed computing device, or any computing device. Such devices include devices used for augmented reality, games, and devices with transducers or sensors, accelerometers, as just a few examples. Devices can also include all forms of wearable devices including "hearables" and jewelry that includes sensors or transducers that may operate as a node or as a sensor or transducer in conjunction with other devices, Streaming: generally means delivery of data either locally or from remote sources that can include storage locally or remotely (or none at all).

Proximity: in proximity to an ear can mean near a head or shoulder, but in other contexts can have additional range within the presence of a human hearing capability or within an electronically enhanced local human hearing capability.

The term "sensor" refers to a device that detects or measures a physical property and enables the recording, presentation or response to such detection or measurement using a processor and optionally memory. A sensor and processor can take one form of information and convert such information into another form, typically having more usefulness than the original form. For example, a sensor may collect raw physiological or environmental data from various sensors and process this data into a meaningful assessment, such as pulse rate, blood pressure, or air quality using a processor. A "sensor" herein can also collect or harvest acoustical data for biometric analysis (by a processor) or for digital or analog voice communications. A "sensor" can include any one or more of a physiological sensor (e.g., blood pressure, heart beat, etc.), a biometric sensor (e.g., a heart signature, a fingerprint, etc.), an environmental sensor (e.g., temperature, particles, chemistry, etc.), a neurological sensor (e.g., brainwaves, EEG, etc.), or an acoustic sensor (e.g., sound pressure level, voice recognition, sound recognition, etc.) among others. A variety of microprocessors or other processors may be used herein. Although a single processor or sensor may be represented in the figures, it should be understood that the various processing and sensing functions can be performed by a number of processors and sensors operating cooperatively or a single processor and sensor arrangement that includes transceivers and numerous other functions as further described herein.

Exemplary physiological and environmental sensors that may be incorporated into a Bluetooth® or other type of earpiece module include, but are not limited to accelerometers, auscultatory sensors, pressure sensors, humidity sensors, color sensors, light intensity sensors, pulse oximetry sensors, pressure sensors, and neurological sensors, etc.

The sensors can constitute biometric, physiological, environmental, acoustical, or neurological among other classes of sensors. In some embodiments, the sensors can be embedded or formed on or within an expandable element or balloon or other material that is used to occlude (or partially occlude) the ear canal. Such sensors can include non-invasive contactless sensors that have electrodes for EEGs, ECGs, transdermal sensors, temperature sensors, transducers, microphones, optical sensors, motion sensors or other biometric, neurological, or physiological sensors that can monitor brainwaves, heartbeats, breathing rates, vascular signatures, pulse oximetry, blood flow, skin resistance, glucose levels, and temperature among many other parameters. The sensor(s) can also be environmental including, but not limited to, ambient microphones, temperature sensors, humidity sensors, barometric pressure sensors, radiation sensors, volatile chemical sensors, particle detection sensors, or other chemical sensors. The sensors can be directly coupled to a processor or wirelessly coupled via a wireless communication system. Also note that many of the components can be wirelessly coupled (or coupled via wire) to each other and not necessarily limited to a particular type of connection or coupling.

The foregoing is illustrative of the present embodiments and is not to be construed as limiting thereof Although a few exemplary embodiments have been described, those skilled in the art will readily appreciate that many modifications are possible in the exemplary embodiments without materially departing from the teachings and advantages of the embodiments. Accordingly, all such modifications are intended to be included within the scope of the embodiments as defined in the claims. The embodiments are defined by the following claims, with equivalents of the claims to be included therein.

Those with ordinary skill in the art may appreciate that the elements in the figures are illustrated for simplicity and clarity and are not necessarily drawn to scale. For example, the dimensions of some of the elements in the figures may be exaggerated, relative to other elements, in order to improve the understanding of the present embodiments.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

While the embodiments have been disclosed in connection with the preferred embodiments shown and described in detail, various modifications and improvements thereon will become readily apparent to those skilled in the art. Accordingly, the spirit and scope of the present embodiments are not to be limited by the foregoing examples, but is to be understood in the broadest sense allowable by law.

All documents referenced herein are hereby incorporated by reference.

I claim:

1. A wearable, comprising:
- a first earpiece having
  - a first wireless module to send data wirelessly to a mobile phone or to a cloud,
  - a plurality of first microphones to produce first audio data,
  - a first motion sensor to produce first motion data, and
  - a first processor that is configured to:
    - perform first digital signal processing on the first audio data or the first motion data;
    - determine whether the first earpiece is limited in power resources or processing resources; and
    - shift or pass the first digital signal processing to the mobile phone or to the cloud by using the first wireless module to transfer the first audio data or the first motion data to the mobile phone or to the cloud, in response to determining that the first earpiece is limited in power resources or processing resources.

2. The wearable of claim 1 wherein the first processor is further configured to use the first wireless module to transfer the first audio data or the first motion data to the mobile phone or the cloud when a voice activity detection or a keyword detection has a confidence of speech content that is below a confidence threshold, and wherein the mobile phone or the cloud then processes the first audio data or the first motion data for speech content.

3. The wearable of claim 1 wherein the first wireless module is to send the data wirelessly using a Bluetooth protocol.

4. The wearable of claim 1 wherein the first wireless module is to send the data wirelessly using a Wi-Fi protocol.

5. The wearable of claim 1 wherein the first wireless module is to send the data wirelessly using a Bluetooth protocol.

6. The wearable of claim 1 wherein the first wireless module is to send the data wirelessly using a Wi-Fi protocol.

7. The wearable of claim 1 further comprising:
- a second earpiece having
  - a second wireless module to send data wirelessly to the mobile phone or to the cloud,
  - a plurality of second microphones to produce second audio data,
  - a second motion sensor to produce second motion data, and
  - a second processor that is configured to:
    - perform second digital signal processing on the second audio data or the second motion data;
    - determine whether the second earpiece is limited in power resources or processing resources; and
    - shift or pass the second digital processing to the mobile phone or to the cloud by using the second wireless module to transfer the second audio data or the second motion data to the mobile phone or to the cloud, in response to determining that the second earpiece is limited in power resources or processing resources,
- wherein each of the first earpiece and the second earpiece comprises a separate power source.

8. The wearable of claim 7 wherein the second processor or the first processor determines which of the first earpiece or the second earpiece, not both, is to send the data wirelessly to the mobile phone or to the cloud.

9. The wearable of claim 8 wherein the second processor or the first processor determines which of the first earpiece or the second earpiece, not both, is to send the data wirelessly to the mobile phone or to the cloud, based on:
- the second processor or the first processor determining i) a battery life remaining in each of the first earpiece and the second earpiece, ii) a level of speech detection by each of the first earpiece and the second earpiece, iii) a level of noise measured by each of the first earpiece and the second earpiece, or iv) a quality measure of an ear canal seal for each of the first earpiece and the second earpiece.

10. The wearable of claim 7 wherein each of the first processor and the second processor periodically receives a message from the mobile phone that requests a power level update, and based on the message a digital processing load is spread between the first earpiece and the second earpiece thereby allowing the separate power source in the second earpiece to remain at a higher energy level than the separate power source in the first earpiece.

11. A method for efficiency among devices, the method comprising:
- performing, by a first processor in a first earpiece, digital signal processing on first data in the first earpiece;
- determining whether the first earpiece is limited in power resources or processing resources; and
- shifting or passing the digital signal processing to a mobile phone or to a cloud by using a first wireless module in the first earpiece to transfer the first data wirelessly to the mobile phone or to the cloud, in response to determining that the first earpiece is limited in power resources or processing resources.

12. The method of claim 11 wherein the first data is first audio data, the method further comprising the first processor using the first wireless module to transfer a first audio data to the mobile phone or the cloud if a voice activity detection or a keyword detection has a confidence of speech content that is below a confidence threshold, and wherein the mobile phone or the cloud then processes first audio data for speech content.

13. The method of claim 11 further comprising:
- performing, by a second processor in a second earpiece, second digital signal processing on a second data in the second earpiece;
- determining whether the second earpiece is limited in power resources or processing resources; and
- shifting or passing the second digital signal processing to the mobile phone or to the cloud by using a second wireless module in the second earpiece to transfer the second data wirelessly to the mobile phone or to the cloud, in response to determining that the second earpiece is limited in power resources or processing resources.

14. The method of claim 13 wherein the second processor or the first processor determines which of the first earpiece or the second earpiece, not both, is to shift or pass the digital signal processing of the first data or the second data to the mobile phone or to the cloud.

15. The method of claim 13 wherein the second processor or the first processor determines which of the first earpiece or the second earpiece, not both, is to send the first data or the second data wirelessly to the mobile phone or to the cloud, based on:

the second processor or the first processor determining i) a battery life remaining in each of the first earpiece and the second earpiece, ii) a level of speech detection by each of the first earpiece and the second earpiece, iii) a level of noise measured by each of the first earpiece and the second earpiece, or iv) a quality measure of an ear canal seal for each of the first earpiece and the second earpiece.

16. The method of claim 13 further comprising:

periodically receiving, by each of the first processor and the second processor, a message from the mobile phone that requests a power level update, and based on the message spreading a digital processing load between the first earpiece and the second earpiece thereby allowing a first power source in the second earpiece to remain at a higher energy level than a second power source in the first earpiece.

17. A memory comprising instructions stored in the memory that configure a first processor in a first earpiece to:

perform first digital signal processing on a first data in the first earpiece;

determine whether the first earpiece is limited in power resources or processing resources; and shift or pass the first digital signal processing to a mobile phone or to a cloud by using a first wireless module in the first earpiece to transfer the first data wirelessly to the mobile phone or to the cloud, in response to determining that the first earpiece is limited in power resources or processing resources.

18. The memory of claim 17 further comprising instructions stored in the memory that configure the first processor to, when the first data is first audio data, transfer using the first wireless module the first audio data to the mobile phone or the cloud if a voice activity detection or a keyword detection has a confidence of speech content that is below a confidence threshold, and wherein the mobile phone or the cloud then processes the first audio data for speech content.

19. The memory of claim 17 wherein the instructions configure the first processor to determine which of the first earpiece or a second earpiece, not both, is to send data wirelessly to the mobile phone or to the cloud, based on the first processor determining i) a battery life remaining in each of the first earpiece and the second earpiece, ii) a level of speech detection by each of the first earpiece and the second earpiece, iii) a level of noise measured by each of the first earpiece and the second earpiece, or iv) a quality measure of a an ear canal seal for each of the first earpiece and the second earpiece.

20. The memory of claim 17 wherein the instructions configure the first processor to periodically receive a message from the mobile phone that requests a power level update and based on the message a digital processing load is spread between the first earpiece and a second earpiece thereby allowing a first power source in the second earpiece to remain at a higher energy level than a second power source in the first earpiece.

* * * * *